United States Patent
Chen et al.

(10) Patent No.: US 11,736,737 B2
(45) Date of Patent: Aug. 22, 2023

(54) QUANTIZATION PARAMETER SIGNALING IN VIDEO PROCESSING

(71) Applicant: ALIBABA GROUP HOLDING LIMITED, Grand Cayman (KY)

(72) Inventors: Jie Chen, Beijing (CN); Ru-Ling Liao, Beijing (CN); Jiancong Luo, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/448,274

(22) Filed: Sep. 21, 2021

(65) Prior Publication Data
US 2022/0094990 A1 Mar. 24, 2022

Related U.S. Application Data

(63) Continuation of application No. 16/999,730, filed on Aug. 21, 2020, now Pat. No. 11,146,829.

(60) Provisional application No. 62/903,251, filed on Sep. 20, 2019.

(51) Int. Cl.
*H04N 19/96* (2014.01)
*H04N 19/159* (2014.01)
*H04N 19/184* (2014.01)
*H04N 19/186* (2014.01)

(52) U.S. Cl.
CPC ......... *H04N 19/96* (2014.11); *H04N 19/159* (2014.11); *H04N 19/184* (2014.11); *H04N 19/186* (2014.11)

(58) Field of Classification Search
None
See application file for complete search history.

(56) References Cited

U.S. PATENT DOCUMENTS

| 9,325,995 | B2 | 4/2016 | Oh et al. |
|---|---|---|---|
| 2014/0003498 | A1 | 1/2014 | Sullivan |
| 2015/0264354 | A1 | 9/2015 | Zhang et al. |
| 2016/0050443 | A1 | 2/2016 | Van der Auwera et al. |

(Continued)

FOREIGN PATENT DOCUMENTS

| GB | 2590634 A | 7/2021 |
|---|---|---|
| GB | 2595280 A | 11/2021 |
| WO | WO 2017/219342 A1 | 12/2017 |

OTHER PUBLICATIONS

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

(Continued)

*Primary Examiner* — Talha M Nawaz
(74) *Attorney, Agent, or Firm* — Finnegan, Henderson, Farabow, Garrett & Dunner, LLP

(57) ABSTRACT

The present disclosure provides methods for processing video content. One exemplary method comprises: receiving a bitstream comprising coded video data; determining a first parameter of a coding block; determining, according to the first parameter, one or more second parameters associated with a delta quantization parameter (QP) value or a chroma QP offset value; and determining, according to the one or more second parameters, at least one of the delta QP value or the chroma QP offset value.

16 Claims, 27 Drawing Sheets

(56) References Cited

U.S. PATENT DOCUMENTS

| | | | |
|---|---|---|---|
| 2016/0353112 A1* | 12/2016 | Zhang | H04N 19/159 |
| 2018/0167615 A1 | 6/2018 | Kim et al. | |
| 2019/0020875 A1 | 1/2019 | Liu et al. | |
| 2020/0068200 A1* | 2/2020 | Galpin | H04N 19/196 |
| 2021/0014480 A1* | 1/2021 | George | H04N 19/82 |

OTHER PUBLICATIONS

Sullivan et al., "Overview of the High Efficiency Video Coding (HEVC) Standard," IEEE Transactions on Circuits and Systems for Video Technology, vol. 22, No. 12, pp. 1649-1668, Dec. 2012.

Chen et al. "Algorithm description of Joint Exploration Test Model 7 (JEM7)", Joint Video Exploration Team (JVET), JVET-G1001,7th Meeting: Torino, IT, Jul. 13-21, 2017, 48 pages.

Segall, "Joint Call for Proposals on Video Compression with Capability beyond HEVC," Joint Video Experts Team (JVET), JVET-H1002, 8th Meeting: Macao, CN, Oct. 18-24, 2017, 27 pages.

Bross et al. "Versatile Video Coding (draft 6)", Joint Video Experts Team (JVET), JVET-O2001-vE, 15th Meeting: Gothenburg, SE, Jul. 3-12, 2019, 455 pages.

PCT International Search Report and Written Opinion dated Nov. 23, 2020, issued in corresponding International Application No. PCT/US2020/047411 (8 pgs.).

European Patent Office Communication issued for Application No. 20865281.8 which encloses the supplementary European Search Report which includes pursuant to Rule 62 EPC, the Supplementary European Search Report and the European search opinion, dated Oct. 20, 2022, 11 pages.

* cited by examiner

Table 5: PPS syntax for CU delta QP

| | Descriptor |
|---|---|
| pic_parameter_set_rbsp( ) { | |
| ... | |
| cu_qp_delta_enabled_flag | u(1) |
| if( cu_qp_delta_enabled_flag ) | |
| cu_qp_delta_subdiv | ue(v) |
| ... | |
| cu_chroma_qp_offset_enabled_flag | u(1) |
| if( cu_chroma_qp_offset_enabled_flag ) { | |
| cu_chroma_qp_offset_subdiv | ue(v) |
| .... | |

FIG. 5

Table 6: Coding tree level syntax for CU delta QP

| | Descriptor |
|---|---|
| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | |
|   if( ( allowSplitBtVer \|\| allowSplitBtHor \|\| allowSplitTtVer \|\| allowSplitTtHor \|\| allowSplitQt ) && ( x0 + cbWidth <= pps_pic_width_in_luma_samples ) && ( y0 + cbHeight <= pps_pic_height_in_luma_samples ) ) | |
|     split_cu_flag | ae(v) |
|   if( pps_cu_qp_delta_enabled_flag && qgOnY && cbSubdiv <= CuQpDeltaSubdiv ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( sh_cu_chroma_qp_offset_enabled_flag && qgOnC && cbSubdiv <= CuChromaQpOffsetSubdiv ) { | |
|     IsCuChromaQpOffsetCoded = 0 | |
|     CuQpOffset$_{Cb}$ = 0 | |
|     CuQpOffset$_{Cr}$ = 0 | |
|     CuQpOffset$_{CbCr}$ = 0 | |
|   } | |
|   if( split_cu_flag ) { | |
|     if( ( allowSplitBtVer \|\| allowSplitBtHor \|\| allowSplitTtVer \|\| allowSplitTtHor ) && allowSplitQt ) | |
|       split_qt_flag | ae(v) |
|     if( !split_qt_flag ) { | |
|       if( ( allowSplitBtHor \|\| allowSplitTtHor ) && ( allowSplitBtVer \|\| allowSplitTtVer ) ) | |
|         mtt_split_cu_vertical_flag | ae(v) |
|       if( ( allowSplitBtVer && allowSplitTtVer && mtt_split_cu_vertical_flag ) \|\| ( allowSplitBtHor && allowSplitTtHor && !mtt_split_cu_vertical_flag ) ) | |
|         mtt_split_cu_binary_flag | ae(v) |
|     } | |
|     if( ModeTypeCondition == 1 ) | |
|       modeType = MODE_TYPE_INTRA | |
|     else if( ModeTypeCondition == 2 ) { | |
|       non_inter_flag | ae(v) |
|       modeType = non_inter_flag ? MODE_TYPE_INTRA : MODE_TYPE_INTER | |
|     } else | |
|       modeType = modeTypeCurr | |
|     treeType = ( modeType == MODE_TYPE_INTRA ) ? DUAL_TREE_LUMA : treeTypeCurr | |

FIG. 6

Table 6: Coding tree level syntax for CU delta QP (continued)

| | |
|---|---|
| if( !split_qt_flag ) { | |
|   if( MttSplitMode[ x0 ][ y0 ][ mttDepth ] == SPLIT_BT_VER ) { | |
|     depthOffset += ( x0 + cbWidth > pps_pic_width_in_luma_samples ) ? 1 : 0 | |
|     x1 = x0 + ( cbWidth / 2 ) | |
|     coding_tree( x0, y0, cbWidth / 2, cbHeight, qgOnY, qgOnC, cbSubdiv + 1, <br>         cqtDepth, mttDepth + 1, depthOffset, 0, treeType, modeType ) | |
|     if( x1 < pps_pic_width_in_luma_samples ) | |
|       coding_tree( x1, y0, cbWidth / 2, cbHeight, qgOnY, qgOnC, cbSubdiv + 1, <br>         cqtDepth, mttDepth + 1, depthOffset, 1, treeType, modeType ) | |
|   } else if( MttSplitMode[ x0 ][ y0 ][ mttDepth ] == SPLIT_BT_HOR ) { | |
|     depthOffset += ( y0 + cbHeight > pps_pic_height_in_luma_samples ) ? 1 : 0 | |
|     y1 = y0 + ( cbHeight / 2 ) | |
|     coding_tree( x0, y0, cbWidth, cbHeight / 2, qgOnY, qgOnC, cbSubdiv + 1, <br>         cqtDepth, mttDepth + 1, depthOffset, 0, treeType, modeType ) | |
|     if( y1 < pps_pic_height_in_luma_samples ) | |
|       coding_tree( x0, y1, cbWidth, cbHeight / 2, qgOnY, qgOnC, cbSubdiv + 1, <br>         cqtDepth, mttDepth + 1, depthOffset, 1, treeType, modeType ) | |
|   } else if( MttSplitMode[ x0 ][ y0 ][ mttDepth ] == SPLIT_TT_VER ) { | |
|     x1 = x0 + ( cbWidth / 4 ) | |
|     x2 = x0 + ( 3 * cbWidth / 4 ) | |
|     qgNextOnY = qgOnY && ( cbSubdiv + 2 <= CuQpDeltaSubdiv ) | |
|     qgNextOnC = qgOnC && ( cbSubdiv + 2 <= CuChromaQpOffsetSubdiv ) | |
|     coding_tree( x0, y0, cbWidth / 4, cbHeight, qgNextOnY, qgNextOnC, cbSubdiv + 2, <br>         cqtDepth, mttDepth + 1, depthOffset, 0, treeType, modeType ) | |
|     coding_tree( x1, y0, cbWidth / 2, cbHeight, qgNextOnY, qgNextOnC, cbSubdiv + 1, <br>         cqtDepth, mttDepth + 1, depthOffset, 1, treeType, modeType ) | |
|     coding_tree( x2, y0, cbWidth / 4, cbHeight, qgNextOnY, qgNextOnC, cbSubdiv + 2, <br>         cqtDepth, mttDepth + 1, depthOffset, 2, treeType, modeType ) | |
|   } else { /* SPLIT_TT_HOR */ | |
|     y1 = y0 + ( cbHeight / 4 ) | |
|     y2 = y0 + ( 3 * cbHeight / 4 ) | |
|     qgNextOnY = qgOnY && ( cbSubdiv + 2 <= CuQpDeltaSubdiv ) | |
|     qgNextOnC = qgOnC && ( cbSubdiv + 2 <= CuChromaQpOffsetSubdiv ) | |
|     coding_tree( x0, y0, cbWidth, cbHeight / 4, qgNextOnY, qgNextOnC, cbSubdiv + 2, <br>         cqtDepth, mttDepth + 1, depthOffset, 0, treeType, modeType ) | |
|     coding_tree( x0, y1, cbWidth, cbHeight / 2, qgNextOnY, qgNextOnC, cbSubdiv + 1, <br>         cqtDepth, mttDepth + 1, depthOffset, 1, treeType, modeType ) | |

FIG. 6 (continued)

Table 6: Coding tree level syntax for CU delta QP (continued)

| |
|---|
| coding_tree( x0, y2, cbWidth, cbHeight / 4, qgNextOnY, qgNextOnC, cbSubdiv + 2, cqtDepth, mttDepth + 1, depthOffset, 2, treeType, modeType ) |
| } |
| } else { |
| x1 = x0 + ( cbWidth / 2 ) |
| y1 = y0 + ( cbHeight / 2 ) |
| coding_tree( x0, y0, cbWidth / 2, cbHeight / 2, qgOnY, qgOnC, cbSubdiv + 2, cqtDepth + 1, 0, 0, 0, treeType, modeType ) |
| if( x1 < pps_pic_width_in_luma_samples ) |
| coding_tree( x1, y0, cbWidth / 2, cbHeight / 2, qgOnY, qgOnC, cbSubdiv + 2, cqtDepth + 1, 0, 0, 1, treeType, modeType ) |
| if( y1 < pps_pic_height_in_luma_samples ) |
| coding_tree( x0, y1, cbWidth / 2, cbHeight / 2, qgOnY, qgOnC, cbSubdiv + 2, cqtDepth + 1, 0, 0, 2, treeType, modeType ) |
| if( y1 < pps_pic_height_in_luma_samples && x1 < pps_pic_width_in_luma_samples ) |
| coding_tree( x1, y1, cbWidth / 2, cbHeight / 2, qgOnY, qgOnC, cbSubdiv + 2, cqtDepth + 1, 0, 0, 3, treeType, modeType ) |
| } |
| if( modeTypeCurr = = MODE_TYPE_ALL && modeType = = MODE_TYPE_INTRA ) |
| coding_tree( x0, y0, cbWidth, cbHeight, 0, qgOnC, cbSubdiv, cqtDepth, mttDepth, 0, 0, DUAL_TREE_CHROMA , modeType ) |
| } else |
| coding_unit( x0, y0, cbWidth, cbHeight, cqtDepth, treeTypeCurr , modeTypeCurr ) |
| } |

FIG. 6 (continued)

Table 7: Transform unit level syntax for CU delta QP

| | Descriptor |
|---|---|
| transform_unit( x0, y0, tbWidth, tbHeight, treeType, subTuIndex, chType ) { | |
|   if( IntraSubPartitionsSplitType != ISP_NO_SPLIT && <br>     treeType == SINGLE_TREE && subTuIndex == NumIntraSubPartitions − 1 ) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && sps_chroma_format_idc != 0 && <br>     ( IntraSubPartitionsSplitType == ISP_NO_SPLIT \|\| <br>     ( IntraSubPartitionsSplitType != ISP_NO_SPLIT && <br>     subTuIndex == NumIntraSubPartitions − 1 ) ) | |
|   if( ( treeType == SINGLE_TREE \|\| treeType == DUAL_TREE_CHROMA ) && <br>     sps_chroma_format_idc != 0 && <br>     ( ( IntraSubPartitionsSplitType == ISP_NO_SPLIT && !( cu_sbt_flag && <br>     ( ( subTuIndex == 0 && cu_sbt_pos_flag ) \|\| <br>     ( subTuIndex == 1 && !cu_sbt_pos_flag ) ) ) ) \|\| <br>     ( IntraSubPartitionsSplitType != ISP_NO_SPLIT && <br>     ( subTuIndex == NumIntraSubPartitions − 1 ) ) ) { | |
|     tu_cb_coded_flag[ xC ][ yC ] | ae(v) |
|     tu_cr_coded_flag[ xC ][ yC ] | ae(v) |
|   } | |
|   if( treeType == SINGLE_TREE \|\| treeType == DUAL_TREE_LUMA ) { | |
|     if( ( IntraSubPartitionsSplitType == ISP_NO_SPLIT && !( cu_sbt_flag && <br>     ( ( subTuIndex == 0 && cu_sbt_pos_flag ) \|\| <br>     ( subTuIndex == 1 && !cu_sbt_pos_flag ) ) ) && <br>     ( ( CuPredMode[ chType ][ x0 ][ y0 ] == MODE_INTRA && <br>     !cu_act_enabled_flag[ x0 ][ y0 ] ) \|\| <br>     ( chromaAvailable && ( tu_cb_coded_flag[ xC ][ yC ] \|\| <br>     tu_cr_coded_flag[ xC ][ yC ] ) ) \|\| <br>     CbWidth[ chType ][ x0 ][ y0 ] > MaxTbSizeY \|\| <br>     CbHeight[ chType ][ x0 ][ y0 ] > MaxTbSizeY ) \|\| <br>     ( IntraSubPartitionsSplitType != ISP_NO_SPLIT && <br>     ( subTuIndex < NumIntraSubPartitions − 1 \|\| !InferTuCbfLuma ) ) ) | |
|     tu_y_coded_flag[ x0 ][ y0 ] | ae(v) |
|     if(IntraSubPartitionsSplitType != ISP_NO_SPLIT ) | |
|       InferTuCbfLuma = InferTuCbfLuma && !tu_y_coded_flag[ x0 ][ y0 ] | |
|   } | |

FIG. 7

Table 7: Transform unit level syntax for CU delta QP

| | |
|---|---|
| if( ( CbWidth[ chType ][ x0 ][ y0 ] > 64 \|\| CbHeight[ chType ][ x0 ][ y0 ] > 64 \|\|<br>    tu_y_coded_flag[ x0 ][ y0 ] \|\| ( chromaAvailable && ( tu_cb_coded_flag[ xC ][ yC ] \|\|<br>    tu_cr_coded_flag[ xC ][ yC ] ) ) && treeType != DUAL_TREE_CHROMA &&<br>    pps_cu_qp_delta_enabled_flag && !IsCuQpDeltaCoded ) { | |
|   cu_qp_delta_abs | ae(v) |
|   if( cu_qp_delta_abs ) | |
|     cu_qp_delta_sign_flag | ae(v) |
| } | |
| if( ( CbWidth[ chType ][ x0 ][ y0 ] > 64 \|\| CbHeight[ chType ][ x0 ][ y0 ] > 64 \|\|<br>    ( chromaAvailable && ( tu_cb_coded_flag[ xC ][ yC ] \|\|<br>    tu_cr_coded_flag[ xC ][ yC ] ) ) ) &&<br>    treeType != DUAL_TREE_LUMA && sh_cu_chroma_qp_offset_enabled_flag &&<br>    !IsCuChromaQpOffsetCoded ) { | |
|   cu_chroma_qp_offset_flag | ae(v) |
|   if( cu_chroma_qp_offset_flag && pps_chroma_qp_offset_list_len_minus1 > 0 ) | |
|     cu_chroma_qp_offset_idx | ae(v) |
| } | |
| if( sps_joint_cbcr_enabled_flag && ( ( CuPredMode[ chType ][ x0 ][ y0 ] == MODE_INTRA<br>    && ( tu_cb_coded_flag[ xC ][ yC ] \|\| tu_cr_coded_flag[ xC ][ yC ] ) ) \|\|<br>    ( tu_cb_coded_flag[ xC ][ yC ] && tu_cr_coded_flag[ xC ][ yC ] ) ) &&<br>    chromaAvailable ) | |
|   tu_joint_cbcr_residual_flag[ xC ][ yC ] | ae(v) |
| if( tu_y_coded_flag[ x0 ][ y0 ] && treeType != DUAL_TREE_CHROMA ) { | |
|   if( sps_transform_skip_enabled_flag && !BdpcmFlag[ x0 ][ y0 ][ 0 ] &&<br>    tbWidth <= MaxTsSize && tbHeight <= MaxTsSize &&<br>    ( IntraSubPartitionsSplitType == ISP_NO_SPLIT ) && !cu_sbt_flag ) | |
|     transform_skip_flag[ x0 ][ y0 ][ 0 ] | ae(v) |
|   if( !transform_skip_flag[ x0 ][ y0 ][ 0 ] \|\| sh_ts_residual_coding_disabled_flag ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cb_coded_flag[ xC ][ yC ] && treeType != DUAL_TREE_LUMA ) { | |
|   if( sps_transform_skip_enabled_flag && !BdpcmFlag[ x0 ][ y0 ][ 1 ] &&<br>    wC <= MaxTsSize && hC <= MaxTsSize && !cu_sbt_flag ) | |
|     transform_skip_flag[ xC ][ yC ][ 1 ] | ae(v) |
|   if( !transform_skip_flag[ xC ][ yC ][ 1 ] \|\| sh_ts_residual_coding_disabled_flag ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| } | |

FIG. 7 (continued)

Table 7: Transform unit level syntax for CU delta QP (continued)

| | |
|---|---|
| if( tu_cb_coded_flag[ xC ][ yC ] && treeType != DUAL_TREE_LUMA ) { | |
|   if( sps_transform_skip_enabled_flag && !BdpcmFlag[ x0 ][ y0 ][ 1 ] && <br>     wC <= MaxTsSize && hC <= MaxTsSize && !cu_sbt_flag ) | |
|     transform_skip_flag[ xC ][ yC ][ 1 ] | ae(v) |
|   if( !transform_skip_flag[ xC ][ yC ][ 1 ] \|\| sh_ts_residual_coding_disabled_flag ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| } | |
| if( tu_cr_coded_flag[ xC ][ yC ] && treeType != DUAL_TREE_LUMA && <br>   !( tu_cb_coded_flag[ xC ][ yC ] && tu_joint_cbcr_residual_flag[ xC ][ yC ] ) ) { | |
|   if( sps_transform_skip_enabled_flag && !BdpcmFlag[ x0 ][ y0 ][ 2 ] && <br>     wC <= MaxTsSize && hC <= MaxTsSize && !cu_sbt_flag ) | |
|     transform_skip_flag[ xC ][ yC ][ 2 ] | ae(v) |
|   if( !transform_skip_flag[ xC ][ yC ][ 2 ] \|\| sh_ts_residual_coding_disabled_flag ) | |
|     residual_coding( xC, yC, Log2( wC ), Log2( hC ), 2 ) | |
|   else | |
|     residual_ts_coding( xC, yC, Log2( wC ), Log2( hC ), 2 ) | |
| } | |
| } | |

FIG. 7 (continued)

Table 8: Slice header syntax

| slice_header( ) { | Descriptor |
|---|---|
| ... | |
| if( partition_constraints_override_enabled_flag ) { | |
|     partition_constraints_override_flag | ue(v) |
|     if( partition_constraints_override_flag ) { | |
|         slice_log2_diff_min_qt_min_cb_luma | ue(v) |
|         slice_max_mtt_hierarchy_depth_luma | ue(v) |
|         if( slice_max_mtt_hierarchy_depth_luma != 0 ) | |
|             slice_log2_diff_max_bt_min_qt_luma | ue(v) |
|             slice_log2_diff_max_tt_min_qt_luma | ue(v) |
|     } | |

FIG. 8

Table 9: Slice header syntax

| slice_header( ) { | Descriptor |
|---|---|
| .. | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma != 0 ){ | |
|         slice_log2_diff_max_bt_min_qt_luma | ue(v) |
|         slice_log2_diff_max_tt_min_qt_luma | ue(v) |
|       } | |
|       if( slice_type = = I && qtbtt_dual_tree_intra_flag ) { | |
|         slice_log2_diff_min_qt_min_cb_chroma | ue(v) |
|         slice_max_mtt_hierarchy_depth_chroma | ue(v) |
|         if( slice_max_mtt_hierarchy_depth_chroma != 0 ){ | |
|           slice_log2_diff_max_bt_min_qt_chroma | ue(v) |
|           slice_log2_diff_max_tt_min_qt_chroma | ue(v) |
|         } | |
|       } | |
|     } | |
|   } | |
|   *if( cu_qp_delta_enabled_flag )* | |
|   *cu_qp_delta_subdiv* | *ue(v)* |
|   *if( cu_chroma_qp_offset_enabled_flag ) {* | |
|   *cu_chroma_qp_offset_subdiv* | *ue(v)* |
| | |

Table 10: Slice header syntax

| slice_header( ) { | Descriptor |
|---|---|
| .. | |
| if( partition_constraints_override_enabled_flag ) { | |
|   partition_constraints_override_flag | ue(v) |
|   if( partition_constraints_override_flag ) { | |
|     slice_log2_diff_min_qt_min_cb_luma | ue(v) |
|     slice_max_mtt_hierarchy_depth_luma | ue(v) |
|     if( slice_max_mtt_hierarchy_depth_luma != 0 ){ | |
|       slice_log2_diff_max_bt_min_qt_luma | ue(v) |
|       slice_log2_diff_max_tt_min_qt_luma | ue(v) |
|     } | |
|     if( slice_type == I && qtbtt_dual_tree_intra_flag ) { | |
|       slice_log2_diff_min_qt_min_cb_chroma | ue(v) |
|       slice_max_mtt_hierarchy_depth_chroma | ue(v) |
|       if( slice_max_mtt_hierarchy_depth_chroma != 0 ){ | |
|         slice_log2_diff_max_bt_min_qt_chroma | ue(v) |
|         slice_log2_diff_max_tt_min_qt_chroma | ue(v) |
|       } | |
|     } | |
|   } | |
| } | |
| *cu_qp_delta_enabled_flag* | *u(1)* |
| *if( cu_qp_delta_enabled_flag )* | |
|   *cu_qp_delta_subdiv* | *ue(v)* |
| *cu_chroma_qp_offset_enabled_flag* | *u(1)* |
| *if( cu_chroma_qp_offset_enabled_flag ) {* | |
|   *cu_chroma_qp_offset_subdiv* | *ue(v)* |
| | |

Table 11: Exemplary Picture Header Syntax

| picture_header_structure( ) { | Descriptor | |
|---|---|---|
| ... | u(1) | |
|   ph_inter_slice_allowed_flag | u(1) | |
|   if( ph_inter_slice_allowed_flag ) | | |
|     ph_intra_slice_allowed_flag | u(1) | |
| ... | | |
|   if( sps_partition_constraints_override_enabled_flag ) | | |
|     ph_partition_constraints_override_flag | u(1) | |
|   if( ph_intra_slice_allowed_flag ) { | | |
|     if( ph_partition_constraints_override_flag ) { | | |
|       ph_log2_diff_min_qt_min_cb_intra_slice_luma | ue(v) | |
|       ph_max_mtt_hierarchy_depth_intra_slice_luma | ue(v) | |
|       if( ph_max_mtt_hierarchy_depth_intra_slice_luma != 0 ) { | | |
|         ph_log2_diff_max_bt_min_qt_intra_slice_luma | ue(v) | |
|         ph_log2_diff_max_tt_min_qt_intra_slice_luma} | ue(v) | |
|       if( sps_qtbtt_dual_tree_intra_flag ) { | | |
|         ph_log2_diff_min_qt_min_cb_intra_slice_chroma | ue(v) | |
|         ph_max_mtt_hierarchy_depth_intra_slice_chroma | ue(v) | |
|         if( ph_max_mtt_hierarchy_depth_intra_slice_chroma != 0 ) { | | |
|           ph_log2_diff_max_bt_min_qt_intra_slice_chroma | ue(v) | |
|           ph_log2_diff_max_tt_min_qt_intra_slice_chroma | ue(v) | |
|       }}} | | |
|     if( pps_cu_qp_delta_enabled_flag ) | | |
|       *ph_cu_qp_delta_subdiv_intra_slice* | ue(v) | }1101 |
|     if( pps_cu_chroma_qp_offset_list_enabled_flag ) | | |
|       *ph_cu_chroma_qp_offset_subdiv_intra_slice* | ue(v) | }1102 |
|   } | | |
|   if( ph_inter_slice_allowed_flag ) { | | |
|     if( ph_partition_constraints_override_flag ) { | | |
|       ph_log2_diff_min_qt_min_cb_inter_slice | ue(v) | |
|       ph_max_mtt_hierarchy_depth_inter_slice | ue(v) | |
|       if( ph_max_mtt_hierarchy_depth_inter_slice != 0 ) { | | |
|         ph_log2_diff_max_bt_min_qt_inter_slice | ue(v) | |
|         ph_log2_diff_max_tt_min_qt_inter_slice    }} | ue(v) | |
|     if( pps_cu_qp_delta_enabled_flag ) | | |
|       *ph_cu_qp_delta_subdiv_inter_slice* | ue(v) | }1103 |
|     if( pps_cu_chroma_qp_offset_list_enabled_flag ) | | |
|       *ph_cu_chroma_qp_offset_subdiv_inter_slice* | ue(v) | }1104 |
| ...} | | |
|   if( pps_qp_delta_info_in_ph_flag ) | | |
|     ph_qp_delta | se(v) | |
| ...} | | |

FIG. 11

Table 12: PPS syntax for cu_qp_delta_subdiv and cu_chroma_qp_offset_subdiv

| pic_parameter_set_rbsp( ) { | Descriptor | |
|---|---|---|
| ... | | |
| | | |
| cu_qp_delta_enabled_flag | u(1) | |
| if( cu_qp_delta_enabled_flag ) | | |
| *pps_cu_qp_delta_subdiv* | *ue(v)* | } 1201 |
| ... | | |
| cu_chroma_qp_offset_enabled_flag | u(1) | |
| if( cu_chroma_qp_offset_enabled_flag ) { | | |
| *pps_cu_chroma_qp_offset_subdiv* | *ue(v)* | } 1202 |
| ... | | |

FIG. 12

Table 13: Slice header syntax for cu_qp_delta_subdiv and cu_chroma_qp_offset_subdiv

| slice_header( ) { | Descriptor |
|---|---|
| .. | |
| if( partition_constraints_override_enabled_flag ) { | |
|   partition_constraints_override_flag | ue(v) |
|   if( partition_constraints_override_flag ) { | |
|     slice_log2_diff_min_qt_min_cb_luma | ue(v) |
|     slice_max_mtt_hierarchy_depth_luma | ue(v) |
|     if( slice_max_mtt_hierarchy_depth_luma != 0 ){ | |
|       slice_log2_diff_max_bt_min_qt_luma | ue(v) |
|       slice_log2_diff_max_tt_min_qt_luma | ue(v) |
|     } | |
|     if( slice_type == I && qtbtt_dual_tree_intra_flag ) { | |
|       slice_log2_diff_min_qt_min_cb_chroma | ue(v) |
|       slice_max_mtt_hierarchy_depth_chroma | ue(v) |
|       if( slice_max_mtt_hierarchy_depth_chroma != 0 ){ | |
|         slice_log2_diff_max_bt_min_qt_chroma | ue(v) |
|         slice_log2_diff_max_tt_min_qt_chroma | ue(v) |
|       } | |
|     } | |
|   } | |
| } | |
| *if( cu_qp_delta_enabled_flag && partition_constraints_override_flag)* | |
|   *slice_cu_qp_delta_subdiv* | *ue(v)* |
| *if( cu_chroma_qp_offset_enabled_flag && partition_constraints_override_flag) {* | |
|   *slice_cu_chroma_qp_offset_subdiv* | *ue(v)* |
| } | |

1301 brackets the last four rows.

FIG. 13

Table 14: Syntax for sps_max_mtt_depth_luma

| seq_parameter_set_rbsp( ) { | Descriptor | |
|---|---|---|
| ... | | |
| sps_log2_diff_min_qt_min_cb_intra_slice_luma | ue(v) | |
| sps_log2_diff_min_qt_min_cb_inter_slice | ue(v) | |
| sps_log2_diff_min_qt_min_cb_luma | ue(v) | } 1401 |
| sps_max_mtt_hierarchy_depth_inter_slice | ue(v) | |
| sps_max_mtt_hierarchy_depth_intra_slice_luma | ue(v) | |
| sps_max_mtt_depth_luma | ue(v) | } 1402 |
| ... | | |

FIG. 14

Table 15: Syntax for pps_max_mtt_depth_luma

| pic_parameter_set_rbsp( ) { | Descriptor |
|---|---|
| ... | |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
|   *pps_log2_ctb_size* | *ue(v)* |
|   *pps_log2_min_qt* | *ue(v)* |
|   *pps_max_mtt_depth_luma* | *ue(v)* |
| ... | |

Table 16: SPS syntax for cu_qp_delta_subdiv and cu_chroma_qp_offset_subdiv

| seq_parameter_set_rbsp( ) { | Descriptor |
|---|---|
| ... | |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|    sps_log2_diff_max_bt_min_qt_intra_slice_luma | ue(v) |
|    sps_log2_diff_max_tt_min_qt_intra_slice_luma | ue(v) |
| } | |
| if( sps_max_mtt_hierarchy_depth_inter_slices != 0 ) { | |
|    sps_log2_diff_max_bt_min_qt_inter_slice | ue(v) |
|    sps_log2_diff_max_tt_min_qt_inter_slice | ue(v) |
| } | |
| *cu_qp_delta_enabled_flag* | u(1) |
| *if( cu_qp_delta_enabled_flag )* | |
| *sps_cu_qp_delta_subdiv* | ue(v) |
| *cu_chroma_qp_offset_enabled_flag* | u(1) |
| *if( cu_chroma_qp_offset_enabled_flag ) {* | |
| *sps_cu_chroma_qp_offset_subdiv* | ue(v) |
| ... | |

}1601 (bracketing last 6 rows)

FIG. 16

Table 17: Slice header syntax for cu_qp_delta_subdiv and cu_chroma_qp_offset_subdiv

| slice_header( ) { | Descriptor |
|---|---|
| .. | |
| if( partition_constraints_override_enabled_flag ) { | |
|   partition_constraints_override_flag | ue(v) |
|   if( partition_constraints_override_flag ) { | |
|     slice_log2_diff_min_qt_min_cb_luma | ue(v) |
|     slice_max_mtt_hierarchy_depth_luma | ue(v) |
|     if( slice_max_mtt_hierarchy_depth_luma != 0 ){ | |
|       slice_log2_diff_max_bt_min_qt_luma | ue(v) |
|       slice_log2_diff_max_tt_min_qt_luma | ue(v) |
|     } | |
|     if( slice_type == I && qtbtt_dual_tree_intra_flag ) { | |
|       slice_log2_diff_min_qt_min_cb_chroma | ue(v) |
|       slice_max_mtt_hierarchy_depth_chroma | ue(v) |
|       if( slice_max_mtt_hierarchy_depth_chroma != 0 ){ | |
|         slice_log2_diff_max_bt_min_qt_chroma | ue(v) |
|         slice_log2_diff_max_tt_min_qt_chroma | ue(v) |
|       } | |
|     } | |
|   } | |
| } | |
| *if( cu_qp_delta_enabled_flag && partition_constraints_override_flag)* | |
| slice_cu_qp_delta_subdiv | *ue(v)* |
| *if( cu_chroma_qp_offset_enabled_flag && partition_constraints_override_flag) {* | |
| slice_cu_chroma_qp_offset_subdiv | *ue(v)* |

Table 18: Syntax for sps_max_mtt_depth_luma

| seq_parameter_set_rbsp( ) { | Descriptor | |
|---|---|---|
| ... | | |
| sps_log2_diff_min_qt_min_cb_luma | ue(v) | }1801 |
| sps_max_mtt_hierarchy_depth_inter_slice | ue(v) | |
| sps_max_mtt_hierarchy_depth_intra_slice_luma | ue(v) | |
| sps_max_mtt_depth_luma | ue(v) | }1802 |
| ... | | |

FIG. 18

Table 19: Syntax for sps_max_mtt_depth_luma

| seq_parameter_set_rbsp( ) { | Descriptor |
|---|---|
| ... | |
| sps_max_mtt_hierarchy_depth_inter_slice | ue(v) |
| sps_max_mtt_hierarchy_depth_intra_slice_luma | ue(v) |
| *sps_max_mtt_depth_luma* | *ue(v)* |
| ... | |

Table 20: Syntax for pps_max_mtt_depth_luma

| pic_parameter_set_rbsp( ) { | Descriptor |
|---|---|
| ... | |
|   if( rect_slice_flag ) { | |
|     signalled_slice_id_flag | u(1) |
|     if( signalled_slice_id_flag ) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
|   *pps_log2_ctb_size* | *ue(v)* |
|   *pps_log2_min_qt* | *ue(v)* |
|   *pps_max_mtt_depth_luma* | *ue(v)* |
| ... | |

(rows *pps_log2_ctb_size*, *pps_log2_min_qt*, *pps_max_mtt_depth_luma* marked as group 2001)

FIG. 20

QUANTIZATION PARAMETER SIGNALING IN VIDEO PROCESSING

CROSS REFERENCE TO RELATED APPLICATION

The present application is a continuation of U.S. patent application Ser. No. 16/999,730, filed on Aug. 21, 2020, which claims the benefits of priority to U.S. Provisional Application No. 62/903,251, filed Sep. 20, 2019, both of which are incorporated herein by reference in their entireties.

TECHNICAL FIELD

The present disclosure generally relates to video processing, and more particularly, to methods and systems for processing video content with quantization parameters.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a computer-implemented method for processing video content, including: receiving a bitstream comprising coded video data; determining a first parameter of a coding block; determining, according to the first parameter, one or more second parameters associated with a delta quantization parameter (QP) value or a chroma QP offset value; and determining, according to the one or more second parameters, at least one of the delta QP value or the chroma QP offset value.

Embodiments of the present disclosure also provide a system for processing video content, including: a memory storing a set of instructions; and at least one processor configured to execute the set of instructions to cause the system to perform: receiving a bitstream comprising coded video data; determining a first parameter of a coding block; determining, according to the first parameter, one or more second parameters associated with a delta quantization parameter (QP) value or a chroma QP offset value; and determining, according to the one or more second parameters, at least one of the delta QP value or the chroma QP offset value.

Embodiments of the present disclosure also provide a non-transitory computer readable medium storing instructions that are executable by at least one processor of a computer system, wherein the execution of the instructions causes the computer system to perform a method including: receiving a bitstream comprising coded video data; determining a first parameter of a coding block; determining, according to the first parameter, one or more second parameters associated with a delta quantization parameter (QP) value or a chroma QP offset value; and determining, according to the one or more second parameters, at least one of the delta QP value or the chroma QP offset value.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 illustrates an example of picture parameter sets (PPS) syntax for coding unit (CU) delta quantization parameter (QP), consistent with embodiments of the disclosure.

FIG. 6 illustrates an example of coding tree level syntax for CU delta QP, consistent with embodiments of the disclosure.

FIG. 7 illustrates an example of transform unit level syntax for CU delta QP, consistent with embodiments of the disclosure.

FIG. 8 illustrates an example of slice header syntax, consistent with embodiments of the disclosure.

FIG. 9 illustrates another example of slice header syntax, consistent with embodiments of the disclosure.

FIG. 10 illustrates yet another example of slice header syntax, consistent with embodiments of the disclosure.

FIG. 11 illustrates another example of picture header syntax, consistent with embodiments of the disclosure.

FIG. 12 illustrates an example of PPS syntax for cu_qp_delta_subdiv and cu_chroma_qp_offset_subdiv, consistent with embodiments of the disclosure.

FIG. 13 illustrates an example of slice header syntax for cu_qp_delta_subdiv and cu_chroma_qp_offset_subdiv, consistent with embodiments of the disclosure.

FIG. 14 illustrates an example of syntax for sps_max_mtt_depth_luma, consistent with embodiments of the disclosure.

FIG. 15 illustrates an example of syntax for pps_max_mtt_depth_luma, consistent with embodiments of the disclosure.

FIG. 16 illustrates an example of SPS syntax for cu_qp_delta_subdiv and cu_chroma_qp_offset_subdiv, consistent with embodiments of the disclosure.

FIG. 17 illustrates an example of slice header syntax for cu_qp_delta_subdiv and cu_chroma_qp_offset_subdiv, consistent with embodiments of the disclosure.

FIG. 18 illustrates an example of syntax for sps_max_mtt_depth_luma, consistent with embodiments of the disclosure.

FIG. 19 illustrates another example of syntax for sps_max_mtt_depth_luma, consistent with embodiments of the disclosure.

FIG. 20 illustrates an example of syntax for pps_max_mtt_depth_luma, consistent with embodiments of the disclosure.

DETAILED DESCRIPTION

Figure 1:
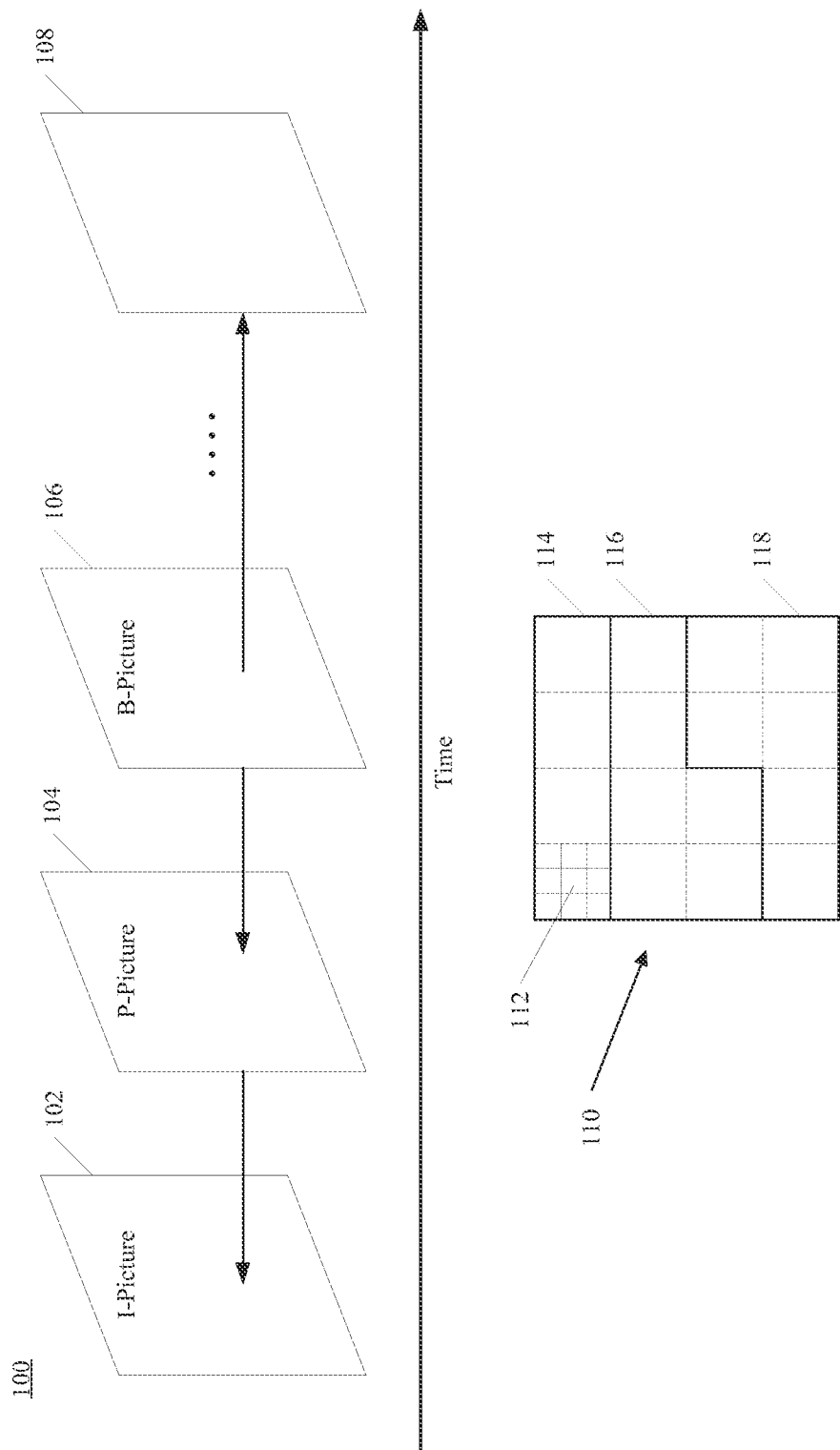
FIG. 1 illustrates structures of an exemplary video sequence, consistent with embodiments of the disclosure, consistent with embodiments of the disclosure.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

This disclosure provides methods, apparatuses, and systems for processing video content using adaptive resolution change (ARC). Unlike inaccurate phases caused by phase rounding, embodiments of the disclosure provide a pixel refinement process based on a fixed-phase interpolation to reduce the complexity of the algorithm and the hardware while maintain accuracy.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TB s" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
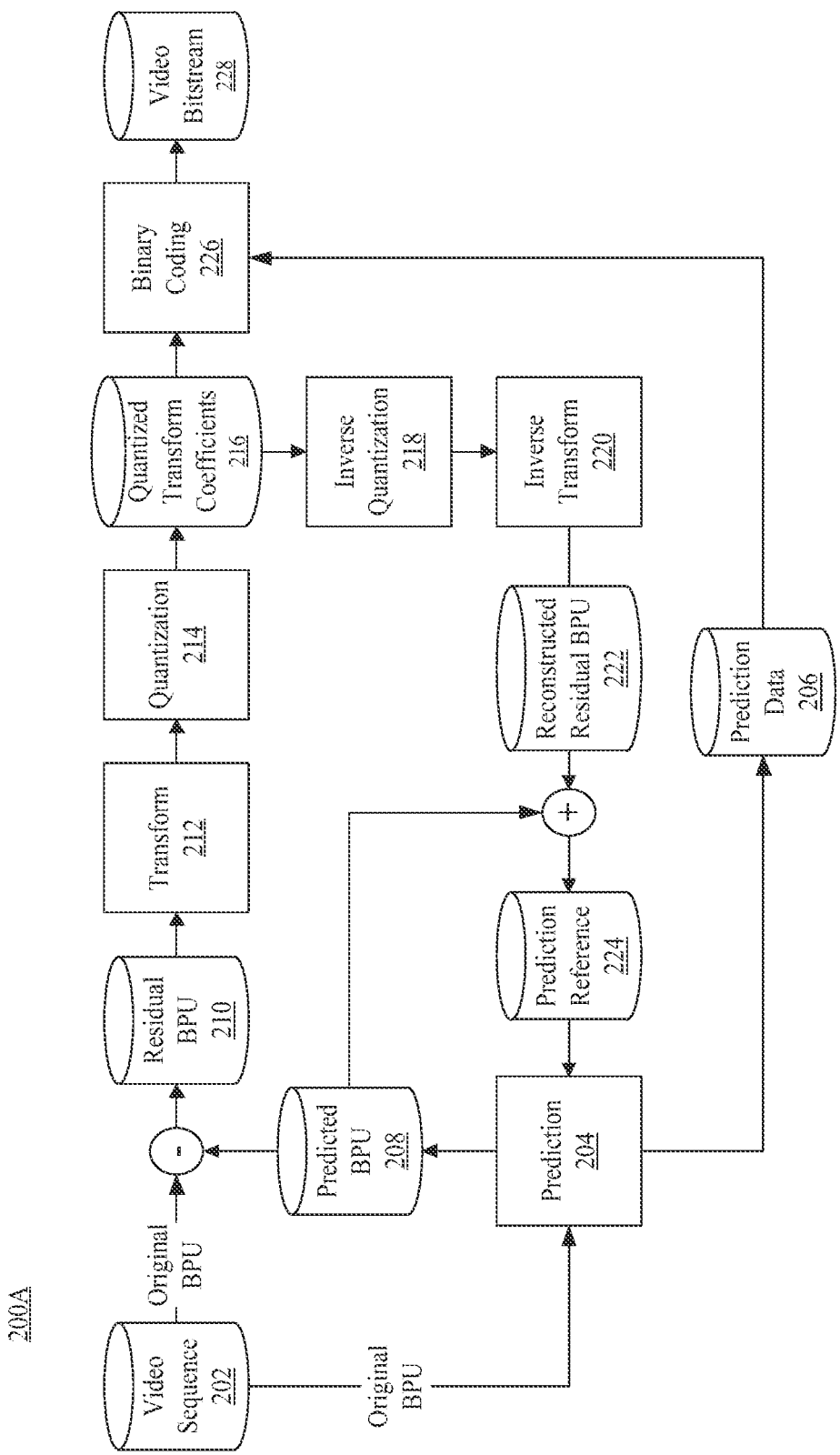
FIG. 2A illustrates a schematic diagram of an exemplary encoding process of a hybrid video coding system, consistent with embodiments of the disclosure.

FIG. 2A illustrates a schematic diagram of an example encoding process 200A, consistent with embodiments of the disclosure. An encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
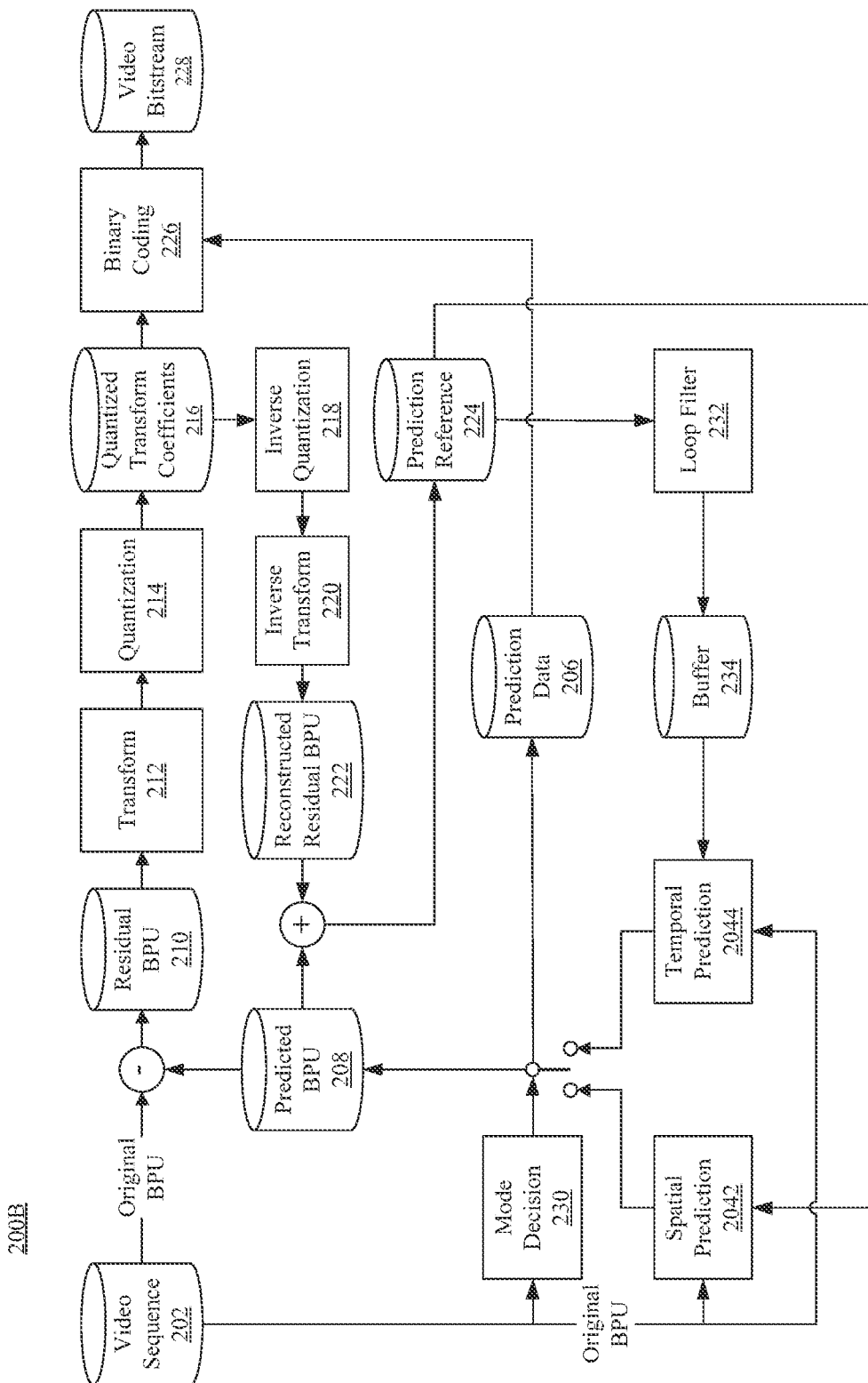
FIG. 2B illustrates a schematic diagram of another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
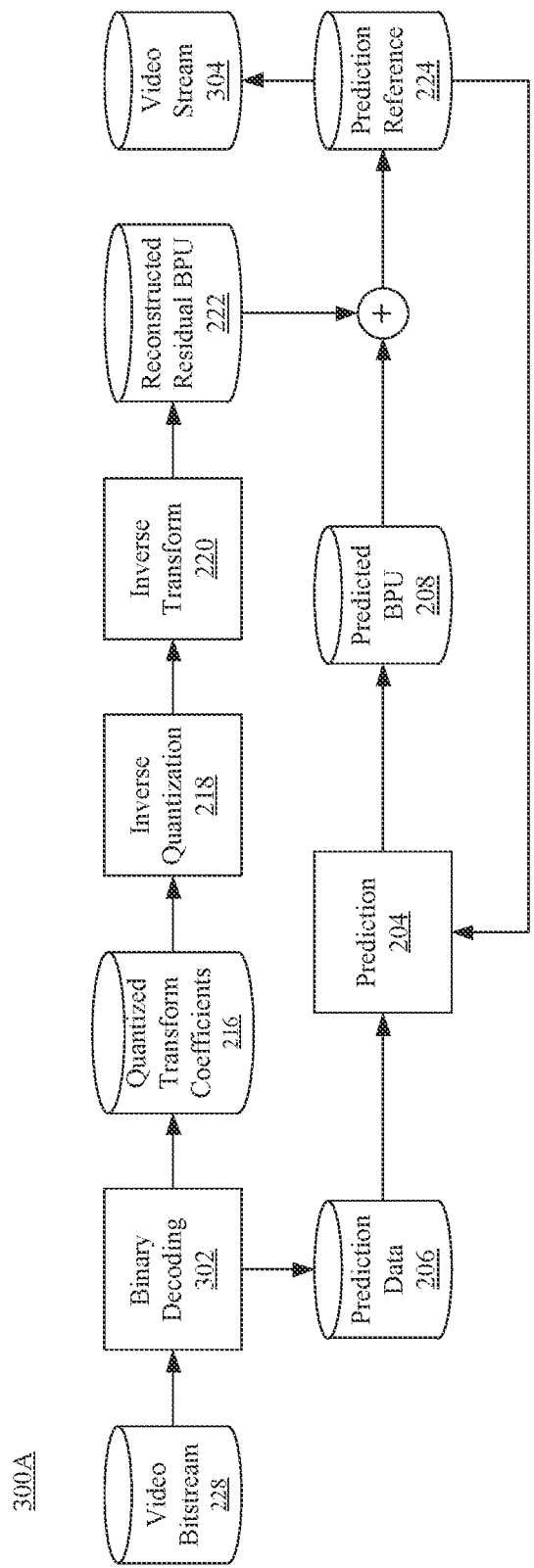
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
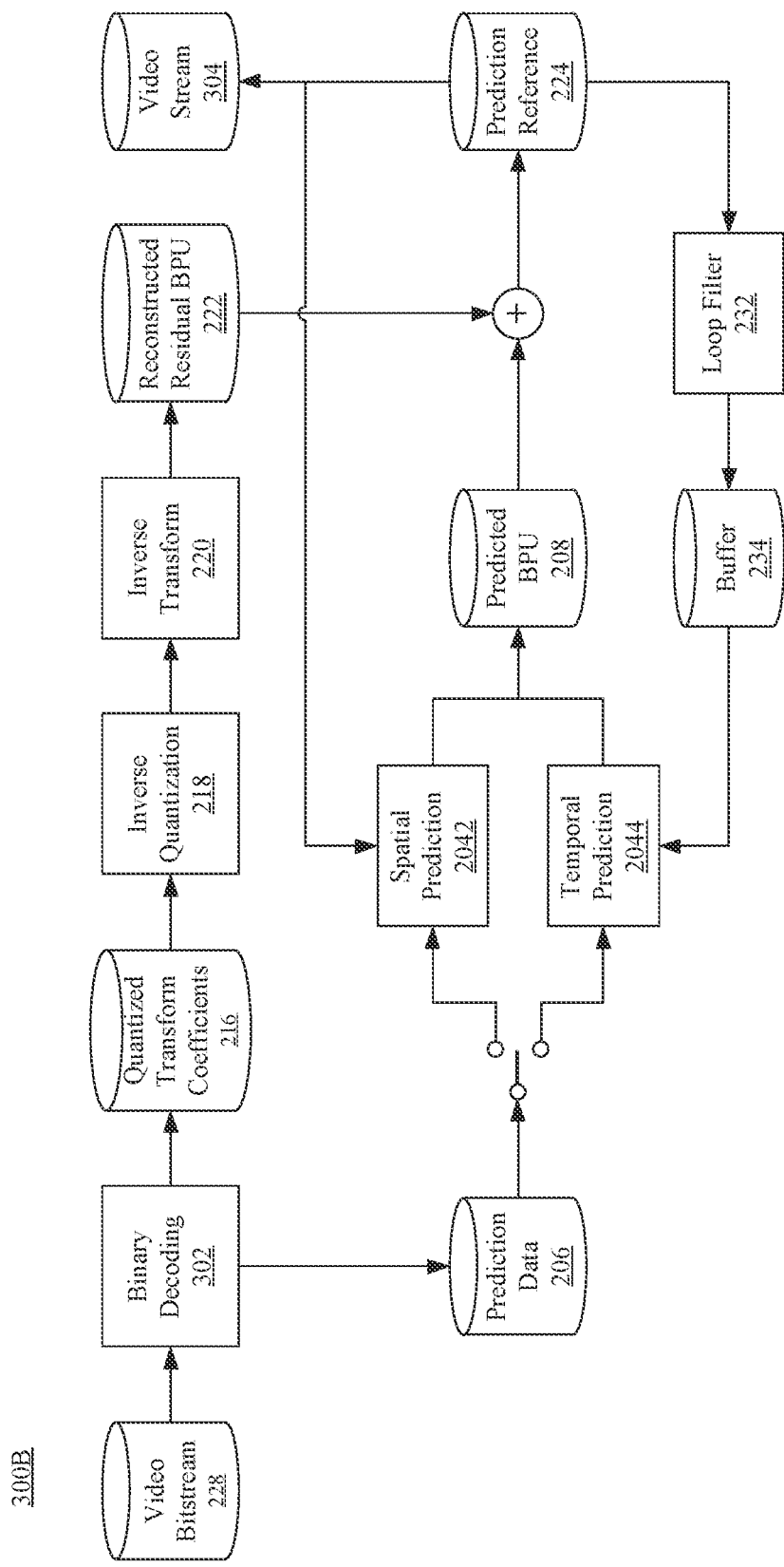
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
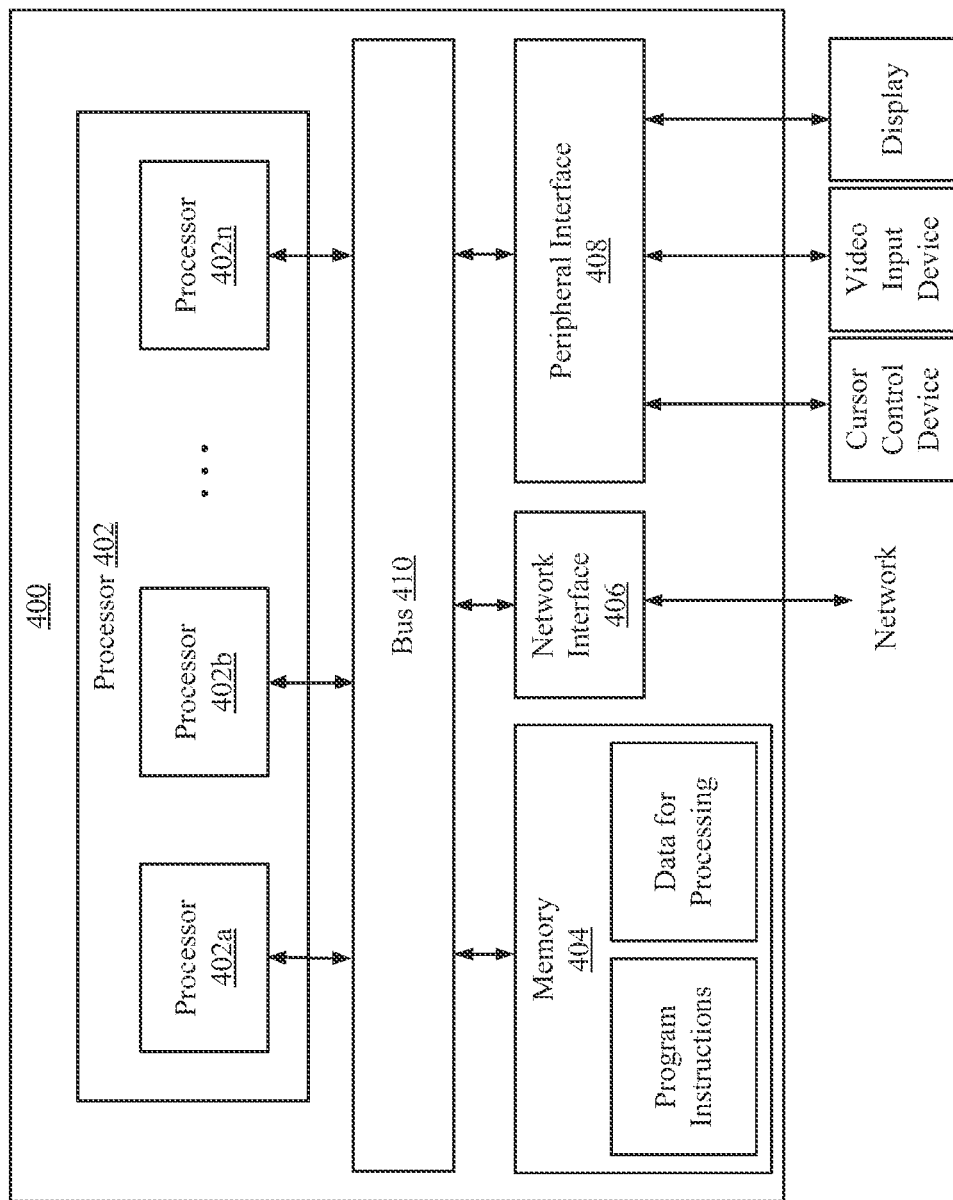
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In VVC, a picture is divided into one or more tile rows and one or more tile columns. A tile is a sequence of CTUs that covers a rectangular region of a picture. The CTUs in a tile are scanned in raster scan order within that tile. A slice consists of an integer number of complete tiles or an integer number of consecutive complete CTU rows within a tile of a picture. Consequently, each vertical slice boundary is also a vertical tile boundary. It is possible that a horizontal boundary of a slice is not a tile boundary but consists of horizontal CTU boundaries within a tile. This occurs when a tile is split into multiple rectangular slices, each of which consists of an integer number of consecutive complete CTU rows within the tile.

In VVC, a coded video bitstream which is a sequence of bits in form of network abstraction layer (NAL) unit or byte stream forms one or more coded video sequences (CVS), and each CVS consists of one or more coded layer video sequences (CLVS). A CLVS is a sequence of picture units (PUs) and each PU contains exactly one coded picture.

A PU consists of zero or one picture header (PH) NAL unit which contains picture header syntax structure as payload, one coded picture which comprises one or more video coding layer (VCL) NAL units, and zero or more other non-VCL NAL units. A VCL NAL unit contains a coded slice which consists of slice header and slice data In VVC, a range of quantization parameter (QP) can be from 0 to 63, and the signaling of initial QP can be changed accordingly. The initial value of SliceQpY is modified at the slice level when a non-zero value of slice_qp_delta is coded in the slice header. Specifically, the value of init_qp_minus26 is modified to be in the range of (−26+QpBdOffsetY) to +37. When the size of a transform block is not a power of 4, the transform coefficients are processed along with a modification to the QP or QP levelScale table rather than by multiplication by 181/256 (or 181/128), to compensate for an implicit scaling by the transform process. For transform skip blocks, minimum allowed QP is defined as 4 because quantization step size becomes 1 when QP is equal to 4.

In addition, QP value may be changed from one CU to another CU or from one quantization group to another quantization group. Delta QP values for luma and chroma components can be signaled separately.

For each luma coding block, first, a variable $qP_{Y\_PREV}$ is derived as follows:
  If one or more of the following conditions are true, $qP_{Y\_PREV}$ is set equal to $SliceQp_Y$:
    The current quantization group is the first quantization group in a slice.
    The current quantization group is the first quantization group in a tile.
  Otherwise, $qP_{Y\_PREV}$ is set equal to the luma quantization parameter $Qp_Y$ of the last luma coding unit in the previous quantization group in decoding order.
Second, a variable $qP_{Y\_A}$ is derived as follows:
  If one or more of the following conditions are true, $qP_{Y\_A}$ is set equal to $qP_{Y\_PREV}$:
    the left neighboring block of the current quantization group is unavailable.
    the left neighboring block of the current quantization group and the current coding block are in the different coding tree block (CTB)
  Otherwise, $qP_{Y\_A}$ is set equal to the luma quantization parameter of the coding unit on the upper side of the current quantization group.
Third, the variable $qP_{Y\_B}$ is derived as follows:
  If one or more of the following conditions are true, $qP_{Y\_B}$ is set equal to $qP_{Y\_PREV}$:
    the upper neighboring block of the current quantization group is unavailable.
    the upper neighboring block of the current quantization group and the current coding block are in the different coding tree block (CTB)
  Otherwise, $qP_{Y\_B}$ is set equal to the luma quantization parameter of the coding unit on the left side of the current quantization group.

Fourth, if the current quantization group is the first quantization group in a coding tree block (CTB) row within a brick and the upper neighboring block of the current quantization group is available, qPY_PRED is set to qPY_B
else
qPY_PRED = ( qPY_A + qPY_B + 1 ) >> 1

After deriving qPY_PRED, quantization parameter of the current luma coding block $Qp'_Y$ can be derived using below Equation 1:

$$Qp'_Y = ( ( qPY\_PRED + CuQpDeltaVal + 64 + 2 * QpBdOffsetY )\%( 64 + QpBdOffsetY ) ) \quad \text{(Eq. 1)}$$

where QpBdOffsetY is equal to 6*sps_bitdepth_minus8, and the variable CuQpDeltaVal specifies the difference between the quantization parameter of a the luma coding block and its prediction value.

In VVC, CuQpDeltaVal is specified as cu_qp_delta_abs* (1−2*cu_qp_delta_sign_flag), where cu_qp_delta_abs and cu_qp_delta_sign_flag are syntax elements signaled in the bitstream at CU level. When cu_qp_delta_abs and cu_qp_delta_sign_flag are not present in the bitstream, CuQpDeltaVal can be inferred to be 0.

The quantization parameter for chroma coding block may be different from $Qp_Y$. The offset between a chroma quantization parameter ($Qp_{Cb}$, $Qp_{Cr}$, $Qp_{CbCr}$) and a luma quantization parameter may be signaled in the bitstream. In VVC, chroma quantization parameters $Qp'_{Cb}$ and $Qp'_{Cr}$, and the QP for joint Cb-Cr coding $Qp'_{CbCr}$ can be derived using the following Equations 2-4:

$$Qp'_{Cb} = \text{Clip3}( -\text{QpBdOffset}_C, 63, qP_{Cb} + \text{pps\_cb\_qp\_offset} + \text{slice\_cb\_qp\_offset} + \text{CuQpOffset}_{Cb}) + \text{QpBdOffset}_c \quad \text{(Eq. 2)}$$

$$Qp'_{Cr} = \text{Clip3}( -\text{QpBdOffset}_C, 63, qP_{Cr} + \text{pps\_cr\_qp\_offset} + \text{slice\_cr\_qp\_offset} + \text{CuQpOffset}_{Cr}) + \text{QpBdOffset}_c \quad \text{(Eq. 3)}$$

$$Qp'_{CbCr} = \text{Clip3}( -\text{QpBdOffset}_C, 63, qP_{CbCr} + \text{pps\_cbcr\_qp\_offset} + \text{slice\_cbcr\_qp\_offset} + \text{CuQpOffset}_{CbCr}) + \text{QpBdOffset}_c \quad \text{(Eq. 4)}$$

where $qP_{Cb}$, $qP_{Cr}$, and $qP_{CbCr}$ can be derived from a look-up table with input of clipped value of $Qp_Y$ using Equations 5-8:

$$qPi_{Chroma} = \text{Clip3}( -\text{QpBdOffset}, 63, Qp_Y - \text{QpBdOffset} ) \quad \text{(Eq. 5)}$$

$$qP_{Cb} = \text{ChromaQpTable}[ 0 ][ qP_{Chroma}] \quad \text{(Eq. 6)}$$

$$qP_{Cr} = \text{ChromaQpTable}[ 1 ][ qP_{Chroma}] \quad \text{(Eq. 7)}$$

$$qP_{CbCr} = \text{ChromaQpTable}[ 2 ][ qP_{Chroma}] \quad \text{(Eq. 8)}$$

$\text{CuQpOffset}_{Cb}$, $\text{CuQpOffset}_{Cr}$, and $\text{CuQpOffset}_{CbCr}$ are set to 0 when cu_chroma_qp_offset_flag is equal to 0; and can be derived using Equations 9-11 when cu_chroma_qp_offset_flag is equal to 1:

$$\text{CuQpOffset}_{Cb} = \text{cb\_qp\_offset\_list}[ \text{cu\_chroma\_qp\_offset\_idx} ] \quad \text{(Eq. 9)}$$

$$\text{CuQpOffset}_{Cr} = \text{cr\_qp\_offset\_list}[ \text{cu\_chroma\_qp\_offset\_idx} ] \quad \text{(Eq. 10)}$$

$$\text{CuQpOffset}_{CbCr} = \text{joint\_cbcr\_qp\_offset\_list}[ \text{cu\_chroma\_qp\_offset\_idx} ] \quad \text{(Eq. 11)}$$

where cu_chroma_qp_offset_flag and cu_chroma_qp_offset_idx are syntax elements signaled in the bitstream.

As discussed above, cu_qp_delta_abs and cu_qp_delta_sign_flag are signaled to derive CuQpDeltaVal, which can be used for QP derivation. cu_chroma_qp_offset_flag, cu_chroma_qp_offset_idx, cb_qp_offset_list[i], cr_qp_offset_list[i], and joint_cbcr_qp_offset_list[i] are signaled to derive $\text{CuQpOffset}_{Cb}$, $\text{CuQpOffset}_{Cr}$, and $\text{CuQpOffset}_{CbCr}$, which can be used for chroma QP derivation.

Below is an introduction of the related syntax signaling process. First, cu_qp_delta_enabled_flag, cu_qp_delta_subdiv, cu_chroma_qp_offset_enabled_flag, and cu_chroma_qp_offset_subdiv can be signaled in the picture parameter set (PPS) as shown in FIG. 5, which illustrates exemplary PPS syntax for CU delta QP.

After that, variables IsCuQpDeltaCoded and IsCuChromaQpOffsetCoded, the position of quantization parameter group, and variables qgOnY and qgOnC can be derived at coding tree level as shown in FIG. 6, which illustrates exemplary codingt tree syntax for CU delta QP.

Further, cu_qp_delta_abs/cu_qp_delta_sign_flag and cu_chroma_qp_offset_flag/cu_chroma_qp_offset_idx are signaled at transform unit conditioned upon IsCuQpDeltaCoded and IsCuChromaQpOffsetCoded being derived at the coding unit level, as shown in FIG. 7, which illustrates exemplary transform unit level syntax for CU delta QP.

In the example shown in FIG. 5, cu_qp_delta_subdiv specifies the maximum cbSubdiv value of coding units that convey cu_qp_delta_abs and cu_qp_delta_sign_flag, and cu_chroma_qp_offset_subdiv specifies the maximum cbSubdiv value of coding units that convey cu_chroma_qp_offset_flag. cbSubdiv is a variable of which the value is related to the size of a coding unit. A smaller coding unit has a larger value of cbSubdiv. With the partitioning of a coding unit into multiple sub-coding units, the value of cbSudiv increases. The value range of cu_qp_delta_subdiv and cu_chroma_qp_offset_subdiv are dependent on a variable referred to as MaxMttDepthY, which is derived on slice level and slice type.

$$\text{MaxMttDepthY} = \text{slice\_max\_mtt\_hierarchy\_depth\_luma} \quad \text{(Eq. 12)}$$

where slice_max_mtt_hierarchy_depth_luma is signaled in slice header as shown in FIG. 8, which illustrates exemplary slice header syntax.

As described above, to determine the maximum depth of the coding unit which may convey cu_qp_delta_abs/ cu_qp_delta_sign_flag and cu_chroma_qp_offset_flag, two syntax elements cu_qp_delta_subdiv and cu_chroma_qp_offset_subdiv are signaled in the PPS level. However, the value ranges of cu_qp_delta_subdiv and cu_chroma_qp_offset_subdiv depend on a variable MaxMttDepthY, which is derived on slice level and the type of the slice. Thus, a PPS level syntax element depends on slice level syntax.

In the bitstream syntax structure, PPS is at a higher level than the slice level, and the syntax of PPS comes before slice syntax. For a decoder, the value of higher level syntax can be referenced when parsing lower level syntax. However, the value of lower level syntax cannot be referenced when parsing higher level syntax. Therefore, in the current VVC techniques, that the cu_qp_delta_subdiv and cu_chroma_qp_offset_subdiv depend on slice header syntax creates a logical issue which needs to be solved.

To address the above described problems, solutions are provided in the various embodiments of the present disclosure. In some embodiments, cu_qp_delta_subdiv and cu_chroma_qp_offset_subdiv can be moved to slice header after slice_max_mtt_hierarchy_depth_luma is signaled. That way, cu_qp_delta_subdiv and cu_chroma_qp_offset_subdiv are no longer PPS level syntax elements. One example of slice header syntax is shown in FIG. 9 (e.g., element 901).

In the example shown in FIG. 9, cu_qp_delta_enabled_flag and cu_chroma_qp_offset_enabled_flag are signaled in PPS. In some embodiments, cu_qp_delta_enabled_flag and cu_chroma_qp_offset_enabled_flag can be signaled in the slice header, as shown in FIG. 10 (e.g., element 1001).

In the example shown in FIG. 10, the range of cu_qp_delta_subdiv and cu_chroma_qp_offset_subdiv can be determined as follows. For example, the value range of cu_qp_delta_subdiv can be specified as follows. If slice_type is equal to I, the value of cu_qp_delta_subdiv is in the range of 0 to 2*(CtbLog2SizeY−MinQtLog2SizeIntraY+MaxMttDepthY), inclusive. Otherwise (slice_type is not equal to I), the value of cu_qp_delta_subdiv is in the range of 0 to 2*(CtbLog2SizeY−MinQtLog2SizeInterY+MaxMttDepthY), inclusive. When not present, the value of cu_qp_delta_subdiv can be inferred to be equal to 0.

The value range of cu_chroma_qp_offset_subdiv can be specified as follows. If slice_type is equal to I, the value of cu_chroma_qp_offset_subdiv is in the range of 0 to 2*(CtbLog2SizeY−MinQtLog2SizeIntraY+MaxMttDepthY), inclusive. Otherwise (slice_type is not equal to I), the value of cu_chroma_qp_offset_subdiv is in the range of 0 to 2*(CtbLog2SizeY−MinQtLog2SizeInterY+MaxMttDepthY), inclusive. When not present, the value of cu_chroma_qp_offset_subdiv can be inferred to be equal to 0.

In some embodiments, cu_qp_delta_subdiv and cu_chroma_qp_offset_subdiv are moved to picture header and at the same time syntax elements which are used to derive MaxMttDepthY are also moved to picture header, so that the range of cu_qp_delta_subdiv and cu_chroma_qp_offset_subdiv are not dependent on slice level syntax.

Since one picture may contain multiple slices with different slice types of inter and intra. Thus, in this embodiment, cu_qp_delta_subdiv is are split into two syntax elements, namely ph_cu_qp_delta_subdiv_intra_slice and ph_cu_qp_delta_subdiv_inter_slice. cu_chroma_qp_offset_subdiv is split into two syntax elements, namely ph_cu_chroma_qp_offset_subdiv_intra_slice and ph_cu_chroma_qp_offset_subdiv_inter_slice. ph_cu_qp_delta_subdiv_intra_slice and ph_cu_chroma_qp_offset_subdiv_intra_slice are for intra slice in the current picture and ph_cu_qp_delta_subdiv_inter_slice and ph_cu_chroma_qp_offset_subdiv_inter_slice are for inter slice in the current picture. Similarly, two syntax elements are signaled for MaxMttDepthY of intra slice and inter slice, namely ph_max_mtt_hierarchy_depth_intra_slice_luma and ph_max_mtt_hierarchy_depth_inter_slice.

An example of picture header syntax is shown in Table 11 of FIG. 11. As shown in Table 11, ph_cu_qp_delta_subdiv_intra_slice (e.g., element 1101), ph_cu_chroma_qp_offset_subdiv_intra_slice (e.g., element 1102), ph_cu_qp_delta_subdiv_inter_slice (e.g., element 1103), and ph_cu_chroma_qp_offset_subdiv_inter_slice (e.g., element 1104) are shown in italics and grey.

For an intra slice, ph_cu_qp_delta_subdiv_intra_slice specifies the maximum cbSubdiv value of coding units in the intra slice that convey cu_qp_delta_abs and cu_qp_delta_sign_flag. The value of ph_cu_qp_delta_subdiv_intra_slice is in the range of 0 to 2*(CtbLog2SizeYMinQtLog2SizeIntraY+ph_max_mtt_hierarchy_depth_intra_slice_luma), inclusive. When not present, the value of ph_cu_qp_delta_subdiv_intra_slice can be inferred to be equal to 0.

ph_cu_chroma_qp_offset_subdiv_intra_slice specifies the maximum cbSubdiv value of coding units in the intra slice that convey cu_chroma_qp_offset_flag. The value of ph_cu_chroma_qp_offset_subdiv_intra_slice is in the range of 0 to 2*(CtbLog2SizeYMinQtLog2SizeIntraY+ph_max_mtt_hierarchy_depth_intra_slice_luma), inclusive. When not present, the value of ph_cu_chroma_qp_offset_subdiv_intra_slice can be inferred to be equal to 0.

In the disclosed embodiments, ph_max_mtt_hierarchy_depth_intra_slice_luma is signaled in picture header, and specifies a maximum hierarchy depth for coding units resulting from multi-type tree splitting of a quadtree leaf in slices with sh_slice_type equal to "I" (i.e., intra-prediction slice). CtbLog2SizeY and MinQtLog2SizeIntraY are derived using the following Equations 13-15, in which CtbLog2SizY represents a size of a luma coding tree block of a coding tree unit in slices with slice_type equal to "I" (i.e., intra-prediction slice), and MinQtLog2SizeIntraY represents a minimum size in luma samples of a luma leaf block resulting from quadtree splitting of the coding tree unit in the slices with slice_type equal to "I."

$$CtbLog2SizeY = sps\_log2\_ctu\_size\_minus5 + 5 \quad \text{(Eq. 13)}$$

$$MinQtLog2SizeIntraY = sps\_log2\_diff\_min\_qt\_min\_cb\_intra\_slice\_luma + MinCbLog2SizeY \quad \text{(Eq. 14)}$$

$$MinCbLog2SizeY = sps\_log2\_min\_luma\_coding\_block\_size\_minus2 + 2 \quad \text{(Eq. 15)}$$

sps_log2_ctu_size_minus5, sps_log2_diff_min_qt_min_cb_intra_slice_luma, and sps_log2_min_luma_coding_block_size_minus2 are syntax elements signaled in SPS.

The variable CuQpDeltaSubdiv is derived as the maximum cbSubdiv value of coding units that convey cu_qp_delta_abs and cu_qp_delta_sign_flag, and the variable CuChromaQpOffsetSubdiv is derived as the maximum cbSubdiv value of coding units that convey cu_chroma_qp_offset_flag. These two variables are derived as Eq. 16 and Eq. 17, respectively.

$$CuQpDeltaSubdiv = ph\_cu\_qp\_delta\_subdiv\_intra\_slice \quad \text{(Eq. 16)}$$

$$CuChromaQpOffsetSubdiv = ph\_cu\_chroma\_qp\_offset\_subdiv\_intra\_slice \quad \text{(Eq. 17)}$$

For an inter slice, ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice may be in the range of 0 to 2*(CtbLog2SizeY−MinQtLog2SizeInterY+ph_max_mtt_hierarchy_depth_inter_slice), inclusive. When not present, the value of ph_cu_qp_delta_subdiv_inter_slice can be inferred to be equal to 0. ph_cu_chroma_qp_offset_subdiv_inter_slice specifies the maximum cbSubdiv value of coding units in the inter slice that convey cu_chroma_qp_offset_flag. The value of ph_cu_chroma_qp_offset_subdiv_inter_slice is in the range of 0 to 2*(CtbLog2SizeY−MinQtLog2SizeInterY+ph_max_mtt_hierarchy_depth_inter_slice), inclusive. When not present, the value of ph_cu_chroma_qp_offset_subdiv_inter_slice can be inferred to be equal to 0.

ph_max_mtt_hierarchy_depth_inter_slice can be signaled in picture header, and specifies a maximum hierarchy depth for coding units resulting from multi-type tree splitting of a quadtree leaf in slices with sh_slice_type not equal to "I" (i.e., inter-prediction slice with slice_type equal to "P" or "B"). CtbLog2SizY and MinQtLog2SizeInterY are derived using the following Equations 18-20, in which CtbLog2SizY represents a size of a luma coding tree block of a coding tree unit in slices with slice_type not equal to "I" (i.e., inter-prediction slice with slice_type equal to "P" or "B"), and MinQtLog2SizeInterY represents a minimum size in luma samples of a luma leaf block resulting from quadtree splitting of the coding tree unit in the slices with slice_type not equal to "I."

$$CtbLog2SizeY = sps\_log2\_ctu\_size\_minus5 + 5 \quad \text{(Eq. 18)}$$

$$MinQtLog2SizeInterY = \\ sps\_log2\_diff\_min\_qt\_min\_cb\_inter\_slice\_luma + \\ MinCbLog2SizeY \quad \text{(Eq. 19)}$$

$$MinCbLog2SizeY = \\ sps\_log2\_min\_luma\_coding\_block\_size\_minus2 + 2 \quad \text{(Eq. 20)}$$

sps_log2_ctu_size_minus5, sps_log2_diff_min_qt_min_cb_inter_slice_luma, and sps_log2_min_luma_coding_block_size_minus2 are syntax elements signaled in SPS.

The variable CuQpDeltaSubdiv is derived as the maximum cbSubdiv value of coding units that convey cu_qp_delta_abs and cu_qp_delta_sign_flag and the variable CuChromaQpOffsetSubdi is derived as the maximum cbSubdiv value of coding units that convey cu_chroma_qp_offset_flag. These two variables are derived as Eq. 21 and Eq. 22, respectively.

$$CuQpDeltaSubdiv = ph\_cu\_qp\_delta\_subdiv\_inter\_slice \quad \text{(Eq. 21)}$$

$$CuChromaQpOffsetSubdiv = \\ ph\_cu\_chroma\_qp\_offset\_subdiv\_inter\_slice \quad \text{(Eq. 22)}$$

In some embodiments, cu_qp_delta_subdiv and cu_chroma_qp_offset_subdiv can be signaled both at the PPS level and in the slice header. For example, in PPS syntax, pps_cu_qp_delta_subdiv and pps_cu_chroma_qp_offset_subdiv are signaled, as shown in FIG. 12 (e.g., elements 1201 and 1202). In the slice header, slice_cu_qp_delta_subdiv and slice_cu_chroma_qp_offset_subdiv are also signaled, as shown in FIG. 13 (e.g., element 1301).

In some embodiments, the range of pps_cu_qp_delta_subdiv and pps_cu_chroma_qp_offset_subdiv depend on the syntax of sequence parameter set (SPS), as illustrated in the following example. In this example, the value range of pps_cu_qp_delta_subdiv is specified as follows: the value of pps_cu_qp_delta_subdiv is in the range of 0 to 2*(CtbLog2SizeY−MinQtLog2SizeY+SpsMaxMtt-DepthY), inclusive. When not present, the value of pps_cu_qp_delta_subdiv can be inferred to be equal to 0. The value range of pps_cu_chroma_qp_offset_subdiv is specified as follows: the value of pps_cu_chroma_qp_offset_subdiv may be in the range of 0 to 2*(CtbLog2SizeY−MinQtLog2SizeY+SpsMaxMttDepthY), inclusive. When not present, the value of pps_cu_chroma_qp_offset_subdiv can be inferred to be equal to 0.

In the case where ctbLog2SizeY is defined, MinQtLog2SizeY and SpsMaxMttDepthY can be derived as follows.

In one way, MinQtLog2SizeY can be derived as:

$$\min(MinQtLog2SizeIntraY, MinQtLog2SizeInterY) \\ \text{or} \\ \max(MinQtLog2SizeIntraY, MinQtLog2SizeInterY)$$

It is appreciated that MinQtLog2SizeIntraY and MinQtLog2SizeIntraY can be derived using various techniques, such as those defined in VVC draft 6.

In an alternative way, the value of MinQtLog2SizeY can be derived based on the following Equation 23:

$$MinQtLog2SizeY = sps\_log2\_diff\_min\_qt\_min\_cb\_luma + MinCbLog2SizeY \quad \text{(Eq. 23)}$$

Where sps_log2_diff_min_qt_min_cb_luma is signaled in SPS as shown in FIG. 14 (e.g., element 1401). It is appreciated that MinCbLog2SizeY can be devised using various techniques, such as those defined in VVC draft 6.

With respect to SpsMaxMttDepth, in one way, SpsMaxMttDepthY can be derived as:
min(sps_max_mtt_hierarchy_depth_intra_slice_luma, sps_max_mtt_hierarchy_depth_inter_slice) or
max(sps_max_mtt_hierarchy_depth_intra_slice_luma, sps_max_mtt_hierarchy_depth_inter_slice)
where sps_max_mtt_hierarchy_depth_intra_slice_luma and sps_max_mtt_hierarchy_depth_inter_slice can be signaled in SPS.

In an alternative way, the value of SpsMaxMttDepthY can be derived as:

$$SpsMaxMttDepthY = sps\_max\_mtt\_depth\_luma \quad \text{(Eq. 24)}$$

where sps_max_mtt_depth_luma can be signaled in SPS, as shown in FIG. 14 (e.g., element 1402).

In the above example, PPS syntax elements pps_cu_qp_delta_subdiv and pps_cu_chroma_qp_offset_subdiv depend on SPS syntax. Such parsing dependency between PPS and SPS may not be desirable. In order to address this dependency issue, in some embodiments, the value range of pps_cu_qp_delta_subdiv can be specified as follows.

The value of pps_cu_qp_delta_subdiv is in the range of 0 to 2*(CtbLog2SizeY−MinQtLog2SizeY+ppsMaxMtt-DepthY), inclusive. When not present, the value of pps_cu_qp_delta_subdiv can be inferred to be equal to 0.

The value range of pps_cu_chroma_qp_offset_subdiv can be specified as follows. The value of pps_cu_chroma_qp_offset_subdiv is in the range of 0 to 2*(CtbLog2SizeY−MinQtLog2SizeY+ppsMaxMtt-DepthY), inclusive. When not present, the value of pps_cu_chroma_qp_offset_subdiv can be inferred to be equal to 0.

CtbLog2SizeY, MinQtLog2SizeY, and ppsMaxMtt-DepthY are derived as follows:

$$CtbLog2SizeY = pps\_log2\_ctb\_size \quad (Eq. 25)$$

$$MinQtLog2SizeY = pps\_log2\_min\_qt \quad (Eq. 26)$$

$$ppsMaxMttDepthY = pps\_max\_mtt\_depth\_luma \quad (Eq. 27)$$

pps_log2_ctb_size, pps_log2_min_qt and pps_max_mtt_depth_luma can be signaled in PPS, as shown in FIG. 15 (e.g., element 1501).

In the above examples, the range of slice_cu_qp_delta_subdiv and slice_cu_chroma_qp_offset_subdiv depend on the syntax of the slice header. For example, the value range of slice_cu_qp_delta_subdiv can be specified as follows. If slice_type is equal to I, the value of slice_cu_qp_delta_subdiv is in the range of 0 to 2*(CtbLog2SizeY−MinQtLog2SizeIntraY+SliceMaxMtt-DepthY), inclusive. Otherwise (slice_type is not equal to I), the value of slice_cu_qp_delta_subdiv is in the range of 0 to 2*(CtbLog2SizeY−MinQtLog2SizeInterY+SliceMaxMtt-DepthY), inclusive. When not present, the value of slice_cu_qp_delta_subdiv can be inferred to be equal to 0 or pps_cu_qp_delta_subdiv.

And the value range of slice_cu_chroma_qp_offset_subdiv can be specified as follows. If slice_type is equal to I, the value of slice_cu_chroma_qp_offset_subdiv is in the range of 0 to 2*(CtbLog2SizeY−MinQtLog2SizeIntraY+SliceMaxMttDepthY), inclusive. Otherwise (slice_type is not equal to I), the value of slice_cu_chroma_qp_offset_subdiv is in the range of 0 to 2*(CtbLog2SizeY−MinQtLog2SizeInterY+SliceMaxMttDepthY), inclusive. When not present, the value of slice_cu_chroma_qp_offset_subdiv can be inferred to be equal to 0 or pps_cu_chroma_qp_offset_subdiv.

In cases where CtbLog2SizeY, MinQtLog2SizeIntraY and MinQtLog2SizeInterY are defined, SliceMaxMtt-DepthY can be derived as:

$$SliceMaxMttDepthY = slice\_max\_mtt\_hierarchy\_depth\_luma \quad (Eq. 28)$$

slice_max_mtt_hierarchy_depth_luma can be signaled in the slice header.

In the above examples, cu_qp_delta_subdiv can be inferred to be slice_cu_qp_delta_subdiv. Alternatively, cu_qp_delta_subdiv can be inferred to be pps_cu_qp_delta_subdiv first; then if slice_cu_qp_delta_subdiv is present, slice_cu_qp_delta_subdiv overrides and cu_qp_delta_subdiv can be inferred to be slice_cu_qp_delta_subdiv. The value of cu_qp_delta_subdiv can be used to derive $Qp_Y$.

Further, cu_chroma_qp_offset_subdiv can be inferred to be slice_cu_chroma_qp_offset_subdiv. Alternatively, cu_chroma_qp_offset_subdiv can be inferred to be pps_cu_chroma_qp_offset_subdiv first; then if slice_cu_chroma_qp_offset_subdiv is present, slice_cu_chroma_qp_offset_subdiv overrides and cu_chroma_qp_offset_subdiv can be inferred to be slice_cu_chroma_qp_offset_subdiv. The value of cu_chroma_qp_offset_subdiv can be used to derive $Qp_{Cb}$, $Qp_{Cr}$, $QP_{CbCr}$.

In some embodiments, cu_qp_delta_subdiv and cu_chroma_qp_offset_subdiv can be signaled both at the SPS level and in the slice header. In SPS, sps_cu_qp_delta_subdiv and sps_cu_chroma_qp_offset_subdiv can be signaled as shown in FIG. 16 (e.g., element 1601); and in the slice header, slice_cu_qp_delta_subdiv and slice_cu_chroma_qp_offset_subdiv are signaled as shown in FIG. 17 (e.g., element 1701).

In some embodiments, the range of sps_cu_qp_delta_subdiv and sps_cu_chroma_qp_offset_subdiv depend on the syntax of SPS. For example, the value range of sps_cu_qp_delta_subdiv can be specified as follows. The value of sps_cu_qp_delta_subdiv is in the range of 0 to 2*(CtbLog2SizeY−MinQtLog2SizeY+SpsMaxMtt-DepthY), inclusive. When not present, the value of sps_cu_qp_delta_subdiv can be inferred to be equal to 0. And the value range of sps_cu_chroma_qp_offset_subdiv is specified as follows. The value of sps_cu_chroma_qp_offset_subdiv is in the range of 0 to 2*(CtbLog2SizeY−MinQtLog2SizeY+SpsMaxMttDepthY), inclusive. When not present, the value of sps_cu_chroma_qp_offset_subdiv can be inferred to be equal to 0.

In cases where ctbLog2SizeY is defined, MinQtLog2SizeY and SpsMaxMttDepthY can be derived as follows.

In one way, MinQtLog2SizeY can be derived as:

$$min(MinQtLog2SizeIntraY, MinQtLog2SizeInterY)$$
$$or$$
$$max(MinQtLog2SizeIntraY, MinQtLog2SizeInterY)$$

Where MinQtLog2SizeIntraY and MinQtLog2SizeIntraY can be derived using various techniques, such as those defined in VVC draft 6.

In an alternative way, the value of MinQtLog2SizeY can be derived using Equation 29 below.

$$MinQtLog2SizeY = sps\_log2\_diff\_min\_qt\_min\_cb\_luma + MinCbLog2SizeY \quad (Eq. 29)$$

sps_log2_diff_min_qt_min_cb_luma can be signaled in SPS as shown in FIG. 18 (e.g., element 1801). It is appreciated that MinCbLog2SizeY can be derived using various techniques, such as those defined in VVC draft 6.

With respect to SpsMaxMttDepthY, in one way, SpsMaxMttDepthY can be derived as:
min(sps_max_mtt_hierarchy_depth_intra_slice_luma, sps_max_mtt_hierarchy_depth_inter_slice)
or
max(sps_max_mtt_hierarchy_depth_intra_slice_luma, sps_max_mtt_hierarchy_depth_inter_slice)
sps_max_mtt_hierarchy_depth_intra_slice_luma and sps_max_mtt_hierarchy_depth_inter_slice can be signaled in SPS.

In an alternative way, SpsMaxMttDepthY can be derived as:

$$SpsMaxMttDepthY = sps\_max\_mtt\_depth\_luma \quad (Eq. 30)$$

sps_max_mtt_depth_luma can be signaled in SPS, as shown in FIG. 18 (e.g., element 1802).

Further, in the above examples, the range of slice_cu_qp_delta_subdiv and slice_cu_chroma_qp_offset_subdiv depend on the syntax of the slice header. For example, the value range of slice_cu_qp_delta_subdiv can be specified as follows. If slice_type is equal to I, the value of slice_cu_qp_delta_subdiv is in the range of 0 to 2*(CtbLog2SizeY−MinQtLog2SizeIntraY+SliceMaxMtt-DepthY), inclusive. Otherwise (slice_type is not equal to I), the value of slice_cu_qp_delta_subdiv is in the range of 0 to 2*(CtbLog2SizeY−MinQtLog2SizeInterY+SliceMaxMtt- DepthY), inclusive. When not present, the value of slice_cu_qp_delta_subdiv can be inferred to be equal to 0 or sps_cu_qp_delta_subdiv.

The value range of slice_cu_chroma_qp_offset_subdiv can be specified as follows. If slice_type is equal to I, the value of slice_cu_chroma_qp_offset_subdiv is in the range of 0 to 2*(CtbLog2SizeY−MinQtLog2SizeIntraY+ SliceMaxMttDepthY), inclusive. Otherwise (slice_type is not equal to I), the value of slice_cu_chroma_qp_offset_subdiv is in the range of 0 to 2*(CtbLog2SizeY−MinQtLog2SizeInterY+SliceMaxMttDepthY), inclusive. When not present, the value of slice_cu_chroma_qp_offset_subdiv can be inferred to be equal to 0 or sps_cu_chroma_qp_offset_subdiv.

In cases where CtbLog2SizeY, MinQtLog2SizeIntraY and MinQtLog2SizeInterY are defined, SliceMaxMttDepthY can be derived as:

$$SliceMaxMttDepthY = slice\_max\_mtt\_hierarchy\_depth\_luma \quad (Eq.\ 31)$$

slice_max_mtt_hierarchy_depth_luma can be signaled in the slice header.

In the above examples, cu_qp_delta_subdiv can be inferred to be slice_cu_qp_delta_subdiv. Alternatively, cu_qp_delta_subdiv can be inferred to be sps_cu_qp_delta_subdiv first; then if slice_cu_qp_delta_subdiv is present, slice_cu_qp_delta_subdiv overrides and cu_qp_delta_subdiv can be inferred to be slice_cu_qp_delta_subdiv. Cu_qp_delta_subdiv can be used to derive $Qp_Y$.

Further, in the above examples, cu_chroma_qp_offset_subdiv can be inferred to be slice_cu_chroma_qp_offset_subdiv. Alternatively, cu_chroma_qp_offset_subdiv can be inferred to be sps_cu_chroma_qp_offset_subdiv first; then if slice_cu_chroma_qp_offset_subdiv is present, slice_cu_chroma_qp_offset_subdiv overrides and cu_chroma_qp_offset_subdiv can be inferred to be slice_cu_chroma_qp_offset_subdiv. Cu_chroma_qp_offset_subdiv can be used to derive $Qp_{Cb}$, $Qp_{Cr}$, $QP_{CbCr}$.

In some embodiments, the syntax of cu_qp_delta_subdiv and cu_chroma_qp_offset_subdiv can be signaled at PPS level. However, the range restriction of cu_qp_delta_subdiv and cu_chroma_qp_offset_subdiv can be changed so that they are not dependent on slice syntax.

As an example, cu_qp_delta_subdiv and cu_chroma_qp_offset_subdiv can be signaled in PPS as shown in FIG. 5. The value range of cu_qp_delta_subdiv can be specified as follows. The value of cu_qp_delta_subdiv is in the range of 0 to 2*(CtbLog2SizeY−MinQtLog2SizeY+ MaxMttDepthY), inclusive. When not present, the value of cu_qp_delta_subdiv can be inferred to be equal to 0. The value range of cu_chroma_qp_offset_subdiv can be specified as follows. The value of cu_chroma_qp_offset_subdiv is in the range of 0 to 2*(CtbLog2SizeY−MinQtLog2SizeY+ MaxMttDepthY), inclusive. When not present, the value of cu_chroma_qp_offset_subdiv can be inferred to be equal to 0.

In cases where ctbLog2SizeY is defined, MinQtLog2SizeY and MaxMttDepthY can be inferred on SPS level. For example, MaxMttDepthY can be derived as: min(sps_max_mtt_hierarchy_depth_intra_slice_luma, sps_max_mtt_hierarchy_depth_inter_slice) or max(sps_max_mtt_hierarchy_depth_intra_slice_luma, sps_max_mtt_hierarchy_depth_inter_slice)

sps_max_mtt_hierarchy_depth_intra_slice_luma and sps_max_mtt_hierarchy_depth_inter_slice can be signaled in SPS.

In an alternative way, MaxMttDepthY can be derived as:

$$MaxMttDepthY = sps\_max\_mtt\_depth\_luma$$

sps_max_mtt_depth_luma can be signaled in SPS, as shown in FIG. 19 (e.g., element 1901).

In one way, MinQtLog2SizeY can be derived as:

min(MinQtLog2SizeIntraY, MinQtLog2SizeInterY)
or
max(MinQtLog2SizeIntraY, MinQtLog2SizeInterY)

It is appreciated that MinQtLog2SizeIntraY and MinQtLog2SizeIntraY can be derived using various techniques, such as those defined in VVC draft 6.

In an alternative way, the value of MinQtLog2SizeY can be derived based on the following Equation 32:

$$MinQtLog2SizeY = sps\_log2\_diff\_min\_qt\_min\_cb\_luma + MinCbLog2SizeY \quad (Eq.\ 32)$$

sps_log2_diff_min_qt_min_cb_luma is signaled in SPS as shown in FIG. 13 (e.g., element 1301). It is appreciated that MinCbLog2SizeY can be devised using various techniques, such as those defined in VVC draft 6.

Based on the above example, the range of cu_qp_delta_subdiv and cu_chroma_qp_offset_subdiv are not overridden at the slice header level.

In some embodiments, cu_qp_delta_subdiv and cu_chroma_qp_offset_subdiv can be signaled at PPS level. However, the range restriction of cu_qp_delta_subdiv and cu_chroma_qp_offset_subdiv can be fixed so that they are not dependent on slice syntax.

For example, cu_qp_delta_subdiv and cu_chroma_qp_offset_subdiv can be signaled in PPS as shown in FIG. 5. The value range of cu_qp_delta_subdiv can be specified as follows. the value of cu_qp_delta_subdiv is in the range of 0 to 2*(CtbLog2SizeY−MinQtLog2SizeY+ MaxMttDepthY), inclusive. When not present, the value of cu_qp_delta_subdiv can be inferred to be equal to 0. And the value range of cu_chroma_qp_offset_subdiv is specified as follows. The value of cu_chroma_qp_offset_subdiv is in the range of 0 to 2*(CtbLog2SizeY−MinQtLog2SizeY+ MaxMttDepthY), inclusive. When not present, the value of cu_chroma_qp_offset_subdiv can be inferred to be equal to 0.

Where CtbLog2SizeY, MinQtLog2SizeY and MaxMttDepthY can be derived in the following manners: CtbLog2SizeY/MinQtLog2SizeY/MaxMttDepthY can be specified by profile; or CtbLog2SizeY/MinQtLog2SizeY/ MaxMttDepthY can be a fixed number value.

Based on the above example, the range of cu_qp_delta_subdiv and cu_chroma_qp_offset_subdiv are not overridden at the slice header level.

In some embodiments, cu_qp_delta_subdiv and cu_chroma_qp_offset_subdiv can be signaled in PPS as shown in FIG. 5. The value range of cu_qp_delta_subdiv can be specified as follows. The value of cu_qp_delta_subdiv is in the range of 0 to 2*(CtbLog2SizeY−MinQtLog2SizeY+ MaxMttDepthY), inclusive. When not present, the value of cu_qp_delta_subdiv can be inferred to be equal to 0. And the value range of cu_chroma_qp_offset_subdiv is specified as follows. The value of cu_chroma_qp_offset_subdiv is in the range of 0 to 2*(CtbLog2SizeY−MinQtLog2SizeY+ MaxMttDepthY), inclusive. When not present, the value of cu_chroma_qp_offset_subdiv can be inferred to be equal to 0.

CtbLog2SizeY, MinQtLog2SizeY and MaxMttDepthY can be inferred on PPS level. For example, $$CtbLog2SizeY = pps\_log2\_ctb\_size \quad \text{(Eq. 33)}$$

$$MinQtLog2SizeY = pps\_log2\_min\_qt \quad \text{(Eq. 34)}$$

$$MaxMttDepthY = pps\_max\_mtt\_depth\_luma \quad \text{(Eq. 35)}$$

pps_log2_ctb_size, pps_log2_min_qt and pps_max_mtt_depth_luma are signaled in PPS as shown in FIG. 20 (e.g., element 2001).

Based on the above example, the range of cu_qp_delta_subdiv and cu_chroma_qp_offset_subdiv are not overridden at the slice header level.

Figure 21:
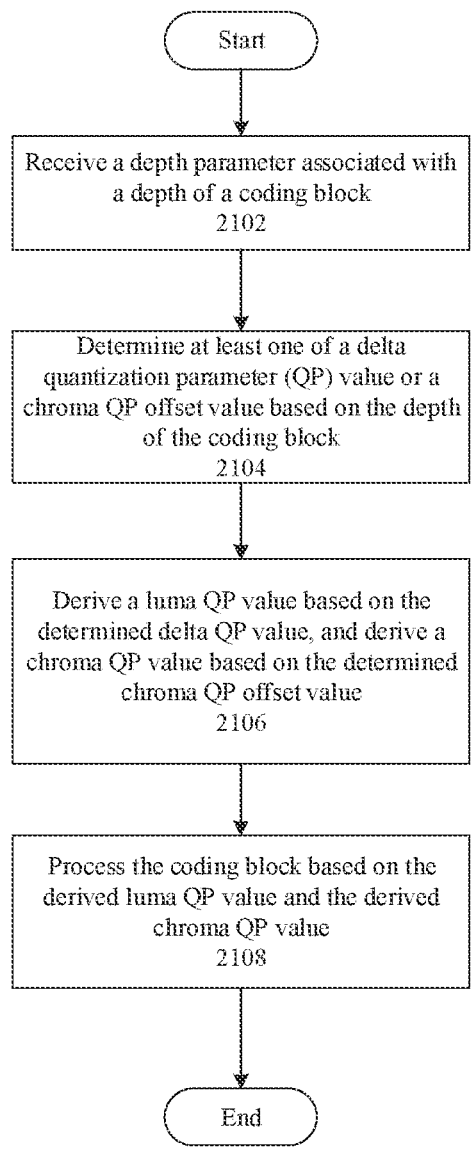
FIG. 21 is a flowchart of an exemplary computer-implemented method for processing video content, consistent with embodiments of the disclosure.

FIG. 21 is a flowchart of a computer-implemented method 2100 for processing video content, consistent with embodiments of the disclosure.

At step 2102, a depth parameter associated with a depth of a coding block can be received. The depth parameter can be e.g., a variable "MaxMttDepthY" derived from a maximum depth of a multiple-type tree hierarchy of a luma block (e.g., "slice_max_mtt_hierarchy_depth_luma"). In some embodiments, "slice_max_mtt_hierarchy_depth_luma" can be signaled in a slice header associated with the coding block.

The coding block can be associated with a slice. The slice may be associated with intra-prediction or inter prediction. In response to the slice being associated with intra-prediction, the delta QP value or the chroma QP offset value can be determined for the slice associated with intra-prediction. Otherwise, in response to the slice being associated with inter-prediction, the delta QP value or the chroma QP offset value can be determined for the slice associated with inter-prediction. For example, when "slice_type" is equal to "I" which indicates the slice is associated with intra prediction, the value of "cu_qp_delta_subdiv" is in the range of 0 to 2*(CtbLog2SizeY−MinQtLog2SizeIntraY+MaxMttDepthY), inclusive. Otherwise, when "slice_type" is not equal to "I", which indicates the slice is associated with inter prediction, the value of "cu_qp_delta_subdiv" is in the range of 0 to 2*(CtbLog2SizeYMinQtLog2SizeInterY+MaxMttDepthY), inclusive. Also as an example, when "slice_type" is equal to "I", the value of "cu_chroma_qp_offset_subdiv" is in the range of 0 to 2*(CtbLog2SizeYMinQtLog2SizeIntraY+MaxMttDepthY), inclusive. Otherwise when "slice_type" is not equal to "I", the value of "cu_chroma_qp_offset_subdiv" is in the range of 0 to 2*(CtbLog2SizeYMinQtLog2SizeInterY+MaxMttDepthY), inclusive.

In some embodiments, the depth parameter can be signaled in a picture header. It is appreciated that a picture may include a plurality of slices. For a slice associated with intra-prediction, the corresponding delta QP value or chroma QP offset value can be determined for the slice associated with intra-prediction. For a slice associated with inter-prediction, the corresponding delta QP value or chroma QP offset value can be determined for the slice associated with inter-prediction. For example, as discussed with reference to Table 11 of FIG. 11, ph_cu_qp_delta_subdiv_intra_slice and ph_cu_chroma_qp_offset_subdiv_intra_slice are signaled in the picture header for deriving the delta QP value and the chroma QP offset value for a slice associated with intra-prediction. And ph_cu_qp_delta_subdiv_inter_slice and ph_cu_chroma_qp_offset_subdiv_inter_slice are signaled in the picture header for deriving the delta QP value and the chroma QP offset value for a slice associated with inter prediction.

At step 2104, at least one of a delta quantization parameter (QP) value or a chroma QP offset value can be determined based on the depth of the coding block. As discussed above, the delta QP value can be determined based on "cu_qp_delta_subdiv," the chroma QP offset value can be determined based on "cu_chroma_qp_offset_subdiv," and "cu_qp_delta_subdiv" and "cu_chroma_qp_offset_subdiv" can be determined based on the variable "MaxMttDepthY."

At step 2106, a luma QP value can be derived based on the determined delta QP value, and a chroma QP value can be derived based on the determined chroma QP offset value.

At step 2108, the coding block can be processed based on the derived luma QP value and the derived chroma QP value.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method, comprising:
   receiving a bitstream comprising coded video data;
   determining a first parameter of a coding block;
   determining, according to the first parameter, one or more second parameters associated with a delta quantization parameter (QP) value or a chroma QP offset value; and
   determining, according to the one or more second parameters, at least one of the delta QP value or the chroma QP offset value.

2. The method according to clause 1, wherein determining the first parameter of the coding block comprises:
   determining if the coding block is associated with an intra-prediction slice or an inter prediction slice; and
   in response to the coding block being associated with the intra-prediction slice, determining the first parameter to be a parameter associated with the intra-prediction slice, or in response to the coding block being associated with the inter-prediction slice, determining the first parameter to be a parameter associated with the inter-prediction slice.

3. The method according to clause 1, wherein the first parameter is signaled in a slice header associated with the coding block.

4. The method according to clause 1, wherein the first parameter is signaled in a picture header associated with the coding block.

5. The method according to clause 1, further comprising:
   determining a luma QP value based on the delta QP value;
   determining a chroma QP value based on the chroma QP offset value; and
   processing the coding block based on the luma QP value and the chroma QP value.

6. A system for processing video content, comprising:
a memory storing a set of instructions; and
at least one processor configured to execute the set of instructions to cause the system to perform:
receiving a bitstream comprising coded video data;
determining a first parameter of a coding block;
determining, according to the first parameter, one or more second parameters associated with a delta quantization parameter (QP) value or a chroma QP offset value; and
determining, according to the one or more second parameters, at least one of the delta QP value or the chroma QP offset value.

7. The system according to clause 6, wherein the at least one processor is configured to execute the set of instructions to cause the system to further perform:
determining if the coding block is associated with an intra-prediction slice or an inter prediction slice; and
in response to the coding block being associated with the intra-prediction slice, determining the first parameter to be a parameter associated with the intra-prediction slice, or
in response to the coding block being associated with the inter-prediction slice, determining the first parameter to be a parameter associated with the inter-prediction slice.

8. The system according to clause 6, wherein the first parameter is signaled in a slice header associated with the coding block.

9. The system according to clause 6, wherein the first parameter is signaled in a picture header associated with the coding block.

10. The system according to clause 6, wherein the at least one processor is configured to execute the set of instructions to cause the system to further perform:
determining a luma QP value based on the delta QP value;
determining a chroma QP value based on the chroma QP offset value; and
processing the coding block based on the luma QP value and the chroma QP value.

11. A non-transitory computer readable medium storing instructions that are executable by at least one processor of a computer system, wherein the execution of the instructions causes the computer system to perform a method comprising:
receiving a bitstream comprising coded video data;
determining a first parameter of a coding block;
determining, according to the first parameter, one or more second parameters associated with a delta quantization parameter (QP) value or a chroma QP offset value; and
determining, according to the one or more second parameters, at least one of the delta QP value or the chroma QP offset value.

12. The non-transitory computer readable medium according to clause 11, wherein the method further comprises:
determining if the coding block is associated with an intra-prediction slice or an inter prediction slice; and
in response to the coding block being associated with the intra-prediction slice, determining the first parameter to be a parameter associated with the intra-prediction slice, or
in response to the coding block being associated with the inter-prediction slice, determining the first parameter to be a parameter associated with the inter-prediction slice.

13. The non-transitory computer readable medium according to clause 11, wherein the first parameter is signaled in a slice header associated with the coding block.

14. The non-transitory computer readable medium according to clause 11, wherein the first parameter is signaled in a picture header associated with the coding block.

15. The non-transitory computer readable medium according to clause 11, wherein the method further comprising:
determining a luma QP value based on the delta QP value;
determining a chroma QP value based on the chroma QP offset value; and
processing the coding block based on the luma QP value and the chroma QP value.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A system for processing video content, comprising:
a memory storing a set of instructions; and
at least one processor configured to execute the set of instructions to cause the system to:
receive a data stream comprising coded video data;
determine a first parameter of a coding block;
determine, according to the first parameter, one or more second parameters associated with a delta quantization parameter (QP) value or a chroma QP offset value, each of the one or more second parameters comprising an intra slice element and an inter slice element; and
determine, according to the one or more second parameters, at least one of the delta QP value or the chroma QP offset value;
wherein the second parameter associated with the delta QP value is split into a delta QP intra slice element and a delta QP inter slice element,
the second parameter associated with chroma QP offset value is split into a chroma QP offset intra slice element and a chroma QP offset inter slice element,
the delta QP intra slice element and the chroma QP offset intra slice element are for an intra slice, and
the delta QP inter slice element and the chroma QP offset inter slice element are for an inter slice.

2. The system of claim 1, wherein the first parameter is signaled in at least one of a slice header or a picture header associated with the coding block.

3. The system of claim 1, wherein the at least one processor is further configured to:
determine a luma QP value based on the delta QP value;
determine a chroma QP value based on the chroma QP offset value; and
process the coding block based on the luma QP value and the chroma QP value.

4. The system of claim 1, wherein the at least one processor is further configured to determine a range of a maximum value of the first parameter based on:
a size of a luma coding tree block of a coding tree unit;
a minimum size of luma samples in a luma leaf block resulting from quadtree splitting of the coding tree unit in an intra slice or an inter slice; and
a maximum hierarchy depth of coding units resulting from multi-type tree splitting of a quadtree leaf in the intra slice or the inter slice.

5. The system of claim 1, wherein the at least one processor is further configured to depacketize the data stream before feeding the data stream to a binary decoding stage.

6. The system of claim 1, wherein the data stream comprises syntax elements that are encoded using an entropy encoding based on one or more of a plurality of contexts used in a binary entropy encoding.

7. A computer-implemented method, comprising:
receiving a data stream comprising coded video data;
determining a first parameter of a coding block;
determining, according to the first parameter, one or more second parameters associated with a delta quantization parameter (QP) value or a chroma QP offset value, each of the one or more second parameters comprising an intra slice element and an inter slice element; and
determining, according to the one or more second parameters, at least one of the delta QP value or the chroma QP offset value;
wherein the second parameter associated with the delta QP value is split into a delta QP intra slice element and a delta QP inter slice element,
the second parameter associated with chroma QP offset value is split into a chroma QP offset intra slice element and a chroma QP offset inter slice element,
the delta QP intra slice element and the chroma QP offset intra slice element are for an intra slice, and
the delta QP inter slice element and the chroma QP offset inter slice element are for an inter slice.

8. The method of claim 7, wherein the first parameter is signaled in at least one of a slice header or a picture header associated with the coding block.

9. The method of claim 7, further comprising:
determining a luma QP value based on the delta QP value;
determining a chroma QP value based on the chroma QP offset value; and
processing the coding block based on the luma QP value and the chroma QP value.

10. The method of claim 7, the method further comprises determining a range of a maximum value of the first parameter based on:
a size of a luma coding tree block of a coding tree unit;
a minimum size of luma samples in a luma leaf block resulting from quadtree splitting of the coding tree unit in an intra slice or an inter slice; and
a maximum hierarchy depth of coding units resulting from multi-type tree splitting of a quadtree leaf in the intra slice or the inter slice.

11. The method of claim 7, further comprising:
depacketizing the data stream before feeding the data stream to a binary decoding stage.

12. The method of claim 7, wherein the data stream comprises encoded syntax elements that are encoded using an entropy encoding based on one or more of a plurality of contexts used in a binary entropy encoding.

13. The method of claim 7, wherein the at least one processor is further configured to perform a binary decoding to determine the first parameter.

14. A non-transitory computer readable medium storing a data stream comprising coded video data for processing according to a method comprising:
determining a first parameter of a coding block;
determining, according to the first parameter, one or more second parameters associated with a delta quantization parameter (QP) value or a chroma QP offset value, each of the one or more second parameters comprising an intra slice element and an inter slice element; and
determining, according to the one or more second parameters, at least one of the delta QP value or the chroma QP offset value;
wherein the second parameter associated with the delta QP value is split into a delta QP intra slice element and a delta QP inter slice element,
the second parameter associated with chroma QP offset value is split into a chroma QP offset intra slice element and a chroma QP offset inter slice element,
the delta QP intra slice element and the chroma QP offset intra slice element are for an intra slice, and
the delta QP inter slice element and the chroma QP offset inter slice element are for an inter slice.

15. The non-transitory computer readable medium of claim 14, wherein the first parameter is signaled in at least one of a slice header or a picture header associated with the coding block.

16. The non-transitory computer readable medium of claim 14, wherein the method further comprises determining a range of a maximum value of the first parameter based on:
- a size of a luma coding tree block of a coding tree unit;
- a minimum size of luma samples in a luma leaf block resulting from quadtree splitting of the coding tree unit in an intra slice or an inter slice; and
- a maximum hierarchy depth of coding units resulting from multi-type tree splitting of a quadtree leaf in the intra slice or the inter slice.

* * * * *